(12) United States Patent
Chen et al.

(10) Patent No.: US 11,694,556 B2
(45) Date of Patent: Jul. 4, 2023

(54) TIME-SPACE CONVERSION METHOD OF FLIGHT SEQUENCING INFORMATION

(71) Applicant: THE 28TH RESEARCH INSTITUTE OF CHINA ELECTRONICS TECHNOLOGY GROUP CORPORATION, Nanjing (CN)

(72) Inventors: Feifei Chen, Nanjing (CN); Ke Xu, Nanjing (CN); Yibo Ding, Nanjing (CN); Mingwei Zhang, Nanjing (CN); Hui Ding, Nanjing (CN); Ming Tong, Nanjing (CN); Xiaozhu Shi, Nanjing (CN); Yang Zhang, Nanjing (CN); Jibo Huang, Nanjing (CN); Wenyi Tang, Nanjing (CN); Zeyuan Liu, Nanjing (CN); Qingqing Tan, Nanjing (CN); Weiyu Jiang, Nanjing (CN)

(73) Assignee: THE 28TH RESEARCH INSTITUTE OF CHINA ELECTRONICS TECHNOLOGY GROUP CORPORATION, Nanjing (CN)

( * ) Notice: Subject to any disclaimer, the term of this patent is extended or adjusted under 35 U.S.C. 154(b) by 0 days.

(21) Appl. No.: 17/818,955

(22) Filed: Aug. 10, 2022

(65) Prior Publication Data
US 2022/0392356 A1    Dec. 8, 2022

Related U.S. Application Data

(63) Continuation of application No. PCT/CN2022/101839, filed on Jun. 28, 2022.

(30) Foreign Application Priority Data
Apr. 11, 2022    (CN) .......................... 202210372725.8

(51) Int. Cl.
*G08G 5/00* (2006.01)
*G01C 21/20* (2006.01)

(52) U.S. Cl.
CPC ........... *G08G 5/0026* (2013.01); *G01C 21/20* (2013.01)

(58) Field of Classification Search
CPC .................................................... G08G 5/0025
See application file for complete search history.

(56) References Cited

U.S. PATENT DOCUMENTS

| 11,508,246 | B1* | 11/2022 | Watson | ............... G08G 5/0013 |
| 2012/0143505 | A1* | 6/2012 | Giovannini | .......... G08G 5/0052 |
| | | | | 701/540 |
| 2020/0233411 | A1* | 7/2020 | Ivanov | .................... G05D 1/104 |
| 2020/0233439 | A1* | 7/2020 | Ivanov | ................ G08G 5/0034 |

(Continued)

FOREIGN PATENT DOCUMENTS

| CN | 104332073 A | 2/2015 |
| CN | 107341620 A | 11/2017 |

(Continued)

OTHER PUBLICATIONS

Abbott, Terrance, S., Nasa Technical Reports No. NASA/CR-2011-217194, An Overview of a Trajectory-Based Solution for En Route and Terminal Area Self-Spacing to Include Parallel Runway Operations (https://ntrs.nasa.gov/citations/20110022655)(Nov. 1, 2011) (hereinafter "Abbot").*

*Primary Examiner* — Jean Paul Cass
(74) *Attorney, Agent, or Firm* — CBM Patent Consulting, LLC

(57) ABSTRACT

A time-space conversion method of flight sequencing information aims to solve a problem that a flight sequencing suggestion generated by an arrival management system has poor effect in practical application due to abstract characteristics, comprising: generating a sequencing time and a delay suggestion of a flight in each key point in a terminal area and each runway by using a flight sequencing technol- (Continued)

ogy; predicting a flight status of the flight according to a current position and 4D trajectory information of the flight, and filtering a delay-consumed flight segment, and on that basis, generating a flight segment delay allocation strategy with reference to an aircraft performance and sequencing information, and obtaining a flight segment delay allocation result; and generating a visual spatial position reference target according to the flight segment delay allocation result and an operation deviation limit.

8 Claims, 8 Drawing Sheets

(56) References Cited

U.S. PATENT DOCUMENTS

| | | | |
|---|---|---|---|
| 2020/0234601 A1* | 7/2020 | Ivanov | G09B 29/003 |
| 2022/0334595 A1* | 10/2022 | Famularo | B64C 13/18 |
| 2022/0335841 A1* | 10/2022 | Huncha | G08G 5/0034 |
| 2022/0343768 A1* | 10/2022 | Di Cosola | G06Q 10/0832 |
| 2022/0343776 A1* | 10/2022 | Di Cosola | G08G 5/0026 |
| 2022/0415187 A1* | 12/2022 | Borgyos | G06Q 50/30 |
| 2022/0415190 A1* | 12/2022 | Borgyos | G08G 5/0069 |
| 2023/0010838 A1* | 1/2023 | Borgyos | G08G 5/0069 |

FOREIGN PATENT DOCUMENTS

| | | | | |
|---|---|---|---|---|
| CN | 107591034 A | 1/2018 | | |
| CN | 109615163 A | 4/2019 | | |
| EP | 3251108 A1 * | 12/2017 | | B64C 39/024 |
| WO | 2021/218251 A1 | 11/2021 | | |

\* cited by examiner

TIME-SPACE CONVERSION METHOD OF FLIGHT SEQUENCING INFORMATION

CROSS REFERENCES

This application is the U.S. continuation application of International Application No. PCT/CN2022/101839 filed on 28 Jun. 2022 which designated the U.S. and claims priority to Chinese Application No. CN202210372725.8 filed 11 Apr. 2022, the entire contents of each of which are hereby incorporated by reference.

TECHNICAL FIELD

The present invention relates to a time-space conversion method of information, and more particularly, to a time-space conversion method of flight sequencing information.

BACKGROUND

As a bottleneck area of aviation network operation, a terminal area is characterized by high traffic density, complex airspace structure and numerous operation limits, and an aircraft is prone to hovering or maneuvering in the terminal area, which reduces the operation efficiency. Therefore, developed aviation countries such as Europe and America all adopt a flight sequencing technology to construct an arrival management system (AMAN), in order to improve the traffic operation efficiency in the terminal area. In principle, the flight sequencing technology can comprehensively consider various operation limits in the terminal area, and can optimally allocate a time for the flight to pass through each key point and each runway on the basis of accurately predicting a flight trajectory, optimize the utilization of capacity resources in the terminal area, and ensure the safe, sequential and efficient circulation of a traffic flow. However, in practical application, a flight sequencing suggestion generated by the flight sequencing technology has abstract characteristics, and is difficult for an air traffic controller to guide an aircraft strictly according to the sequencing suggestion, which in turn leads to an actual operation effect of the arrival management system (AMAN) failing to meet expectations. In response to the above problems, the present invention provides a time-space conversion method of flight sequencing information, which can convert the abstract timing suggestion into an intuitive spatial position reference target, facilitating the air traffic controller to guide the aircraft more accurately according to a planned time generated by the arrival management system (AMAN), enhancing a time-based planning and operation ability of the air traffic controller, and laying a technical foundation for future implementation of Trajectory-based Operation (TBO).

SUMMARY

Object of the present invention: the technical problem to be solved by the present invention is to provide a time-space conversion method of flight sequencing information aiming at the deficiencies of the prior art.

In order to solve the foregoing technical problem, the present invention discloses a time-space conversion method of flight sequencing information, comprising the following steps of:

step 1: flight sequencing and spacing; and generating a sequencing time and a delay suggestion of the flight in each key point in a terminal area and each runway by using a flight sequencing technology;

step 2: allocating a flight segment delay; and predicting a flight status of the flight according to a current position and 4D trajectory information of the flight, and filtering a delay-consumed flight segment, and on that basis, generating a flight segment delay allocation strategy with reference to an aircraft performance and sequencing information, and obtaining a flight segment delay allocation result; and step 3: generating a reference trajectory circle; and generating a visual spatial position reference target according to the flight segment delay allocation result and an operation deviation limit, which provides a visual reference for an air traffic controller to guide the aircraft according to the sequencing time; the aircraft takes off or lands.

In the present invention, the step 2 comprises: predicting the flight status of the flight according to the current position and the 4D trajectory information of the flight, and filtering the delay-consumed flight segment, and on that basis, generating the flight segment delay allocation strategy with reference to the aircraft performance and the sequencing information, comprising the following steps of:

step 2-1: defining variables;
step 2-2: filtering the delay-consumed flight segment;
step 2-3: dividing the flight segment according to a sequencing key point;
step 2-4: dividing the flight segment according to the flight status; and
step 2-5: allocating the flight segment delay to obtain the flight segment delay allocation result.

In the present invention, the defining the variables in the step 2-1 comprises:

SysTime: denoting a current time of a system;
$Flt_i$: denoting an it flight;
$PtList_i$: denoting a flight trajectory point queue of the flight $Flt_i$, wherein the queue is generated according to a flight plan of the flight (by using a 4D trajectory predicting technology) and contains waypoints in a flight route and interpolation point information between waypoints;
$PtNum_i$: denoting a number of trajectory points in the flight trajectory point queue $PtList_i$ of the flight $Flt_i$;
$Pt_{i,j}$: denoting a $j^{th}$ trajectory point of the flight trajectory point queue $PtList_i$ of the flight $Flt_i$, wherein $Pt_{i,j} \in PtList_i$;
$ETO_{i,j}$: denoting an estimated passing time of the aircraft $Flt_i$ at $Pt_{i,j}$;
$CTO_{i,j}$: denoting a sequencing passing time of the aircraft $Flt_i$ at $Pt_{i,j}$ (the sequencing time of the sequencing key point in the method is provided by the step 1; and sequencing time of other types of points is updated by the step), wherein an initial value is $ETO_{i,j}$;
$Div(CTO_{i,j})$: denoting a difference of the sequencing passing time $CTO_{i,j}$ of the aircraft $Flt_i$ at $Pt_{i,j}$ allocated in two adjacent computation periods (in a unit of second);
DivLimit: denoting an upper limit of the difference of the sequencing passing time of the aircraft at the sequencing key point allocated in adjacent computation periods;
$PtPro_{i,j}$: denoting a sequencing attribute of the point $Pt_{i,j}$, wherein a value of 1 denotes that the point is a sequencing key point, and a value of 0 denotes others;
$PtDelay_{i,j}$: denoting an estimated passing time delay of the aircraft $Flt_i$ at $Pt_{i,j}$;
$[Pt_{i,j}, Pt_{i,k}]$: denoting a flight segment from the point $Pt_{i,j}$ to a point $Pt_{i,k}$ in $PtList_i$, wherein $Pt_{i,j}$ denotes an origin of the flight segment, $Pt_{i,k}$ denotes an end point of the flight segment, and k denotes a serial number of the point $Pt_{i,k}$ in the queue $PtList_i$;

SegNum$_{j,k}$: denoting a number of small flight segments contained in the flight segment [Pt$_{i,j}$, Pt$_{i,k}$];

SegDis$_{j,k}$: denoting a flight length of the aircraft Flt$_i$ at the flight segment [Pt$_{i,j}$, Pt$_{i,k}$];

SegMinSpeed$_{j,k}$: denoting a minimum safe flight speed of the aircraft Flt$_i$ at the flight segment [Pt$_{i,j}$, Pt$_{i,k}$], wherein the parameter is acquired according to the aircraft performance or an airspace operation limit;

SegMaxSpeed$_{j,k}$: denoting a maximum safe flight speed of the aircraft Flt$_i$ at the flight segment [Pt$_{i,j}$, Pt$_{i,k}$], wherein the parameter is acquired according to the aircraft performance or the airspace operation limit;

Seg Pr o$_{j,k}$: denoting a flight status of the aircraft Flt$_i$ at the flight segment [Pt$_{i,j}$, Pt$_{i,k}$] wherein a value of 1 denotes level flight, and a value of 0 denotes others;

SegDelay$_{j,k}$: denoting a delay value that needs to be consumed by the aircraft Flt$_i$ at the flight segment [Pt$_{i,j}$, Pt$_{i,k}$] (in a unit of second);

SegDelayTmp$_{j,k}$: denoting a temporary variable of the delay that needs to be consumed by the aircraft Flt$_i$ at the flight segment [Pt$_{i,j}$, Pt$_{i,k}$] (used in the calculating process of the method, and in a unit of second);

SegMaxDelay$_{j,k}$: denoting a maximum positive delay value capable of being consumed by the aircraft Flt$_i$ at the flight segment [Pt$_{i,j}$, Pt$_{i,k}$] (in a unit of second); and SegMaxAcc$_{j,k}$: denoting a maximum negative delay value capable of being consumed by the aircraft Flt$_i$ at the flight segment [Pt$_{i,j}$, Pt$_{i,k}$] (in a unit of second).

In the present invention, the step 2-2 comprises the following steps of:

letting Pt$_{i,bgn}$ be an origin of the flight segments participating in delay consumption in the flight trajectory point queue PtList$_i$ of the flight Flt$_i$, and bgn denotes a serial number of the point Pt$_{k,bgn}$ in the queue PtList$_i$;

step 2-2-1: positioning an actual flight segment at which the flight is currently located:

positioning the actual flight segment [Pt$_{i,cur}$, Pt$_{i,cur+1}$] at which the flight Flt$_i$ is currently located according to the estimated passing time ETO$_{i,j}$ of each point Pt$_{i,j}$ in the flight trajectory point queue PtList$_i$ of the flight Flt$_i$, and satisfying that SysTime∈[ETO$_{i,cur}$, ETO$_{i,cur+1}$]; wherein, Pt$_{i,cur}$ denotes an origin of the actual flight segment at which the flight Flt$_i$ is currently located, and Pt$_{i,cur+1}$ denotes an end point of the actual flight segment at which the flight Flt$_i$ is currently located; cur denotes a serial number of the point Pt$_{i,cur}$ in the queue PtList$_i$, and cur+1 denotes a serial number of the point Pt$_{i,cur+1}$ in the queue PtList$_i$; ETO$_{i,cur}$ denotes an estimated passing time of the flight Flt$_i$ at the point Pt$_{i,cur}$, and ETO$_{i,cur+1}$ denotes an estimated passing time of the flight Flt$_i$ at the point Pt$_{i,cur+1}$;

step 2-2-2: positioning a reference flight segment at which the flight is currently located:

positioning the reference flight segment [Pt$_{i,ref}$, Pt$_{i,ref+1}$] at which the flight Flt$_i$ is currently located according to the sequencing passing time CTO$_{i,j}$ of each point Pt$_{i,j}$ in the flight trajectory point queue PtList$_i$ of the flight Flt$_i$, and satisfying that SysTime∈[CTO$_{i,ref}$, CTO$_{i,ref+1}$]; wherein, Pt$_{i,ref}$ denotes an origin of the reference flight segment at which the flight Flt$_i$ is currently located, and Pt$_{i,ref+1}$ denotes an end point of the reference flight segment at which the flight Flt$_i$ is currently located; ref denotes a serial number of the point Pt$_{i,ref}$ in the queue PtList$_i$, and ref+1 denotes a serial number of the point Pt$_{i,ref+1}$ in the queue PtList$_i$; CTO$_{i,ref}$ denotes a sequencing passing time of the flight Flt$_i$ at the point Pt$_{i,ref}$, and CTO$_{i,ref+1}$ denotes a sequencing passing time of the flight Flt$_i$ at the point Pt$_{i,ref+1}$;

step 2-2-3: searching for an adjacent sequencing key point in a preceding flight segment:

letting Pt$_{i,pre}$ be the sequencing key point closest to a current position Pt$_{i,cur}$ in the preceding flight segment [Pt$_{i,1}$, Pt$_{i,cur}$] of the flight Flt$_i$, wherein Pre denotes a serial number of the point Pt$_{i,pre}$ in the queue PtList$_i$;

letting Pt$_{i,tmp}$ be an intermediate variable of flight trajectory points of the flight Flt$_i$ in the calculation process of the method, wherein tmp denotes a serial number of the point Pt$_{i,tmp}$ in the queue PtList$_i$;

when satisfying that ∃Pt$_{i,tmp}$∈[Pt$_{i,1}$, Pt$_{i,cur}$], and satisfying:

$$\text{Min}\{(ETO_{i,cur}-ETO_{i,tmp}+1)*PtPro_{i,tmp}\}>0 \quad (1)$$

letting Pt$_{i,pre}$=Pt$_{i,tmp}$, and continuously executing step 2-2-4; otherwise, letting Pt$_{i,pre}$=∅, and executing step 2-2-5;

step 2-2-4: judging whether a sequencing key point exists between the actual position of the flight and the reference flight segment:

when satisfying that ETO$_{i,cur}$>ETO$_{i,ref}$ and Pt$_{i,pre}$ ∈[Pt$_{i,ref+1}$, Pt$_{i,cur}$], letting Pt$_{i,bgn}$=Pt$_{i,pre}$, and executing step 2-2-7; otherwise, continuously executing step 2-2-5;

step 2-2-5: searching for an adjacent sequencing key point in a subsequent flight segment:

letting Pt$_{i,PtNum_i}$ be the last point in the flight trajectory point queue PtList$_i$ of the flight Flt$_i$;

letting Pt$_{i,aft}$ be the sequencing key point closest to the current position Pt$_{i,cur}$ in the subsequent flight segment [Pt$_{i,cur+1}$, Pt$_{i,PtNum_i}$] of the flight Flt$_i$, wherein aft denotes a serial number of the point Pt$_{i,aft}$ in the queue PtList$_i$;

when satisfying that ∃Pt$_{i,tmp}$∈[Pt$_{i,cur+1}$, Pt$_{i,PtNum_i}$] and satisfying:

$$\text{Min}\{(ETO_{i,tmp}-ETO_{i,cur})*PtPro_{i,tmp}\}>0 \quad (2)$$

letting Pt$_{i,aft}$=Pt$_{i,tmp}$; otherwise, letting Pt$_{i,aft}$=Pt$_{i,PtNum_i}$;

step 2-2-6: judging whether the sequencing time of the subsequent sequencing key point has a certain fluctuation, wherein the method comprises:

calculating a difference Div(CTO$_{i,aft}$) between the currently allocated sequencing time and the allocated sequencing time during last calculation of the flight Flt$_i$ at the sequencing key point Pt$_{i,aft}$, and filtering the origin Pt$_{i,bgn}$ of the delay-consumed flight segment according to Div(CTO$_{i,aft}$), wherein the method is as follows:

for the first operation, letting Div(CTO$_{i,aft}$)=0;

$$Pt_{i,bgn} = \begin{cases} Pt_{i,ref}, & |Div(CTO_{i,aft})| < DivLimit \quad (3) \\ Pt_{i,cur}, & |Div(CTO_{i,aft})| \geq DivLimit \,\&\&\, Pt_{i,pre} == \emptyset; \\ Pt_{i,pre}, & \text{else} \end{cases}$$

step 2-2-7: determining the delay-consumed flight segment:

for the flight Flt$_i$, the filtered flight segments participating in delay consumption are all the subsequent flight segment from Pt$_{i,bgn}$ in the flight trajectory point queue PtList$_i$, which is [Pt$_{i,bgn}$, Pt$_{i,PtNum_i}$]; and step 2-2-8: updating a sequencing time of the origin of the delay-consumed flight segment:

$$CTO_{i,bgn} = \begin{cases} ETO_{i,bgn}, & Pt_{i,bgn} \neq Pt_{i,ref} \,\&\&\, ETO_{i,bgn} \leq SysTime \quad (4) \\ CTO_{i,bgn}, & \text{else} \end{cases}$$

for the first calculation, letting a sequencing time of all the non-sequencing key points Pt$_{i,j}$ in PtList$_i$ be CTO$_{i,j}$=ETO$_{i,j}$;

otherwise, using the last operation result for $CTO_{i,j}$ of all the non-sequencing key points herein.

In the present invention, the dividing the flight segment according to the sequencing key point in the step 2-3 comprises: according to sequencing key point information in the flight trajectory point queue $PtList_i$ of the aircraft $Flt_i$, dividing the delay-consumed flight segment $[Pt_{i,bgn}, Pt_{i,PtNum_i}]$ selected in the step 2-2 into a plurality of small flight segments with overlapped boundary points, wherein the method is as follows:

step 2-3-1: setting a starting point of a sub-segment to be divided in the flight trajectory point queue $PtList_i$ of the flight, which is denoted with $Pt_{i,m}$, and letting $Pt_{i,m}=Pt_{i,bgn}$, wherein n denotes a serial number of the point $Pt_{i,m}$ in the queue $PtList_i$;

step 2-3-2: searching for the closest sequencing key point after $Pt_{i,m}$ from $PtList_i$, which is used as an end point of the sub-segment to be divided, and denoted with $Pt_{i,n}$, wherein n denotes a serial number of the point $Pt_{i,n}$ in the queue $PtList_i$, then the divided sub-flight segment is denoted with $[Pt_{i,m}, Pt_{i,n}]$; and step 2-3-3: letting $Pt_{i,m}=Pt_{i,n}$, and repeating the step 2-3-2 till the last point in $PtList_i$;

all the sub-flight segments divided in the step satisfy the following conditions:

condition 1: $[Pt_{i,m}, Pt_{i,n}] \neq \emptyset$
condition 2: $[Pt_{i,m}, Pt_{i,n}] \subset [Pt_{i,bgn}, Pt_{i,PtNum_i}]$ and
condition 3: $\cup [Pt_{i,m}, Pt_{i,n}] = [Pt_{i,bgn}, Pt_{i,PtNum_i}]$.

In the present invention, the method of dividing the flight segment according to the flight status in the step 2-4 comprises: subdividing each flight segment $[Pt_{i,m}, Pt_{i,n}]$ divided in the step 2-3 according to the flight status of the aircraft in the flight segment, wherein the method comprises:

dividing the flight segment $[Pt_{i,m}, Pt_{i,n}]$ into a plurality of small flight segments $[Pt_{i,o}, Pt_{i,p}]$ with overlapped boundary points according to the flight status of the aircraft, wherein o denotes a serial number of the point $Pt_{i,o}$ in the queue $PtList_i$, p denotes a serial number of the point $Pt_{i,p}$ in the queue $PtList_i$, and movement status of the flight $Flt_i$ in each small flight segment are consistent; and synchronously recording a flight status tag Seg Pr $o_{o,p}$ of the flight $Flt_i$ in each small flight segment $[Pt_{i,o}, Pt_{i,p}]$; and recording a number of the small flight segments divided from the flight segment $[Pt_{i,m}, Pt_{i,n}]$ in the step as $SegNum_{m,n}$, wherein all the small flight segments satisfy the following conditions:

condition 1: $[Pt_{i,o}, Pt_{i,p}] \neq \emptyset$
condition 2: $[Pt_{i,o}, Pt_{i,p}] \subseteq [Pt_{i,m}, Pt_{i,n}]$ and
condition 3: $\cup_1^{SegNum_{m,n}} [Pt_{i,o}, Pt_{i,p}] = [Pt_{i,m}, Pt_{i,n}]$.

In the present invention, the method of allocating the flight segment delay in the step 2-5 comprises: allocating the sequencing delay of the aircraft at the sequencing key point to each flight segment according to the flight status and the flight segment length of the aircraft on each flight segment and the aircraft performance;

performing the following steps in turn for each sub-flight segment $[Pt_{i,m}, Pt_{i,n}]$ of the flight $Flt_i$ divided in the step 2-3:

step 2-5-1: calculating a total delay of the flight segment:

calculating the total delay that needs to be consumed by the flight $Flt_i$ at the flight segment $[Pt_{i,m}, Pt_{i,n}]$ as:

$$SegDelay_{m,n} = (CTO_{i,n} - ETO_{i,n}) - (CTO_{i,m} - ETO_{i,m}) \quad (5)$$

step 2-5-2: calculating an upper limit of the flight segment delay:

estimating the upper limit of the delay of the aircraft at the flight segment from a perspective of performance according to a level flight distance, a minimum level flight speed and a maximum level flight speed of the aircraft in the flight segment;

referring to the step 2-4, and letting each small flight segment divided in the flight segment $[Pt_{i,m}, Pt_{i,n}]$ be $[Pt_{i,o}, Pt_{i,p}]$, then a maximum positive delay capable of being allocated by the flight $Flt_i$ at each small flight segment is:

$$SegMaxDelay_{o,p} = \left(\frac{SegDis_{o,p}}{SegMinSpeed_{o,p}} - (ETO_{i,p} - ETO_{i,0})\right) * SegPro_{o,p} \quad (6)$$

a maximum advance value capable of being allocated by the flight $Flt_i$ at the small flight segment $[Pt_{i,o}, Pt_{i,p}]$ is:

$$SegMaxAcc_{o,p} = \left((ETO_{i,p} - ETO_{i,0}) - \frac{SegDis_{o,p}}{SegMaxSpeed_{o,p}}\right) * SegPro_{o,p} \quad (7)$$

then, the upper limit of the delay capable of being allocated by the flight $Flt_i$ at the small flight segment $[Pt_{i,m}, Pt_{i,n}]$ is:

$$SegMaxDelay_{m,n} = \Sigma_1^{SegNum_{m,n}} SegMaxDelay_{o,p} \quad (8)$$

$$SegMaxAcc_{m,n} = \Sigma_1^{SegNum_{m,n}} SegMaxAcc_{o,p} \quad (9)$$

step 2-5-3: judging whether the flight segment delay is excessive:

when any of the following conditions are satisfied, it is indicated that the delay of the flight $Flt_i$ at the flight segment $[Pt_{i,m}, Pt_{i,j}]$ is excessive, prompting that the flight needs to be manually guided for delay absorption, and returning to step 2-5-1 to continuously processing next sub-flight segment; otherwise, indicating that the delay is within an acceptable range, and continuing subsequent steps;

excessive flight segment delay conditions are as follows:
condition 1: $SegDelay_{m,n} > 0 \&\& SegDelay_{m,n} > SegMaxDelay_{m,n}$ and
condition 2: $SegDelay_{m,n} < 0 \&\& |SegDelay_{m,n}| > SegMaxAcc_{m,n}$ step 2-5-4: allocating the flight segment delay:

allocating a delay for each level flight segment according to a distance and a delay absorption capacity of each level flight segment, wherein the method comprises:

letting $SegDelayTmp_{m,n}$ be the delay needing to be received by the flight $Flt_i$ at the flight segment $[Pt_{i,m}, Pt_{i,n}]$ in the step, and $SegDelayTmp_{m,n} = SegDelay_{m,n}$; and initializing the delay of each small flight segment $[Pt_{i,o}, Pt_{i,p}]$ in the flight segment $[Pt_{i,m}, Pt_{i,n}]$, and letting $SegDelay_{o,p} = 0$; and step 2-5-5: allocating a waypoint delay:

calculating a sequencing time and a delay of the flight $Flt_i$ in a non-sequencing key point of the flight segment $[Pt_{i,m}, Pt_{i,n}]$ according to the delay $SegDelay_{o,p}$ allocated for the flight $Flt_i$ at each small flight segment $[Pt_{i,o}, Pt_{i,p}]$ in the flight segment $[Pt_{i,m}, Pt_{i,n}]$ in the step 2-5-4, wherein the sequencing time and the delay of the sequencing key point are generated by the step 1;

starting from an origin of the flight segment $[Pt_{i,m}, Pt_{i,n}]$, for any point $Pt_{i,q}$ in the flight segment, q denoting a serial number of the point $Pt_{i,q}$ in the queue $PtList_i$, positioning a small flight segment that the point belongs to, i.e. $Pt_{i,q} \in [Pt_{i,o}, Pt_{i,p}]$, then the delay needing to be allocated to the point is as follows:

$$PtDelay_{i,q} = \begin{cases} \dfrac{SegDis_{q-1,q}}{SegDis_{o,p}} * SegDelay_{o,p} + & Pt_{q-1} \in [Pt_{i,o}, Pt_{i,p}] \&\& \\ PtDelay_{i,q-1}, & PtPro_{i,q} = 0 \\ CTO_{i,q} - ETO_{i,q}, & \text{else} \end{cases} \quad (13)$$

the sequencing time of the point $Pt_{i,q}$ is:

$$CTO_{i,q} = ETO_{i,q} + PtDelay_{i,q} \quad (14).$$

In the present invention, the step 2-5-4 comprises the following steps of:

step 2-5-4-1: allocating the flight segment delay:

for each small flight segment $[Pt_{i,o}, Pt_{i,p}]$ in the flight segment $[Pt_{i,m}, Pt_{i,n}]$, the calculating method for allocating the delay according to the level flight distance of each small flight segment is as follows:

$$SegDelay_{o,p} = \quad (10)$$
$$SegDelay_{o,p} + SegDelayTmp_{m,n} * \dfrac{SegDis_{o,p} * SegPro_{o,p}}{\sum_{1}^{SegNum_{m,n}} SegDis_{o,p} * SegPro_{o,p}}$$

correcting according to a flight segment delay absorption capacity, wherein the method is as follows:

$$SegDelay_{o,p} = \quad (11)$$
$$\begin{cases} SegMaxDelay_{o,p}, & SegDelay_{o,p} > SegMaxDelay_{o,p} \\ -1 * SegMaxAcc_{o,p}, & SegDelay_{o,p} < (-1 * SegMaxAcc_{o,p}) \\ SegDelay_{o,p}, & \text{else} \end{cases}$$

step 2-5-4-2: detecting a delay allocation result:

detecting whether any delay which is not allocated exists in the flight segment $[Pt_{i,m}, Pt_{i,n}]$, wherein the method is as follows:

$$SegDelayTmp_{m,n} = SegDelay_{m,n} - \sum_{1}^{SegNum_{m,n}} SegDelay_{o,p} \quad (12)$$

when satisfying that $SegDelayTmp_{m,n} = 0$, indicating that the delay of the flight segment $[Pt_{i,m}, Pt_{i,n}]$ is completely allocated, and continuing step 2-5-5; otherwise, returning to step 2-5-4-1, and updating the flight segment delay allocation result.

In the present invention, the step 3 comprises the following steps of:

step 3-1: defining variables;
step 3-2: positioning the reference flight segment;
step 3-3: generating a reference position point; and
step 3-4: generating the reference trajectory circle;

wherein the defining the variables in the step 3-1 comprises:

$Lat(Pt_{i,j})$: denoting a latitude of the flight $Flt_i$ at the waypoint $Pt_{i,j}$;

$Lon(Pt_{i,j})$: denoting a longitude of the flight $Flt_i$ at the waypoint $Pt_{i,j}$;

$Velo(Pt_{i,j})$: denoting a speed suggestion of the flight $Flt_i$ passing through the waypoint $Pt_{i,j}$;

Res Div: denoting a deviation limit between an actual passing time at the sequencing key point and the sequencing passing time of the flight;

$ATO_{i,j}$: denoting an actual passing time of the flight $Flt_i$ at the waypoint $Pt_{i,j}$; and R: denoting a radius of the reference trajectory circle;

step 3-2: positioning the reference flight segment:

re-positioning the reference flight segment $[Pt_{i,ref}, Pt_{i,ref+1}]$ at which the flight is $Flt_i$ currently located according to the sequencing passing time $CTO_{i,j}$ of each point $Pt_{i,j}$ in the flight trajectory point queue $PtList_i$ of the flight $Flt$ calculated in the step 2-5-5, and satisfying that $SysTime \in [CTO_{i,ref}, CTO_{i,ref+1}]$; and step 3-3: generating the reference position point:

approximately solving a real-time reference position point of the aircraft at the current time of the system by using a difference method, wherein the method comprises:

letting $Pt_{i,x}$ be the current reference position point of the flight $Flt_i$, wherein x denotes a serial number of a point $Pt_{i,x}$ in the queue $PtList_i$, and letting the current reference flight segment at which the flight $Flt_i$ is located be $[Pt_{i,ref}, Pt_{i,ref+1}]$ with reference to the step 3-2, then the method for calculating related information of the reference position point is as follows:

$$Lat(Pt_{i,x}) = \quad (15)$$
$$Lat(Pt_{i,ref}) + \dfrac{SysTime - CTO_{i,ref}}{CTO_{i,ref+1} - CTO_{i,ref}} * (Lat(Pt_{i,ref+1}) - Lat(Pt_{i,ref}))$$

$$Lon(Pt_{i,x}) = \quad (16)$$
$$Lon(Pt_{i,ref}) + \dfrac{SysTime - CTO_{i,ref}}{CTO_{i,ref+1} - CTO_{i,ref}} * (Lon(Pt_{i,ref+1}) - Lon(Pt_{i,ref}))$$

$$Velo(Pt_{i,x}) = \dfrac{SegDis_{ref,ref+1}}{CTO_{i,ref+1} - CTO_{i,ref}}. \quad (17)$$

In the present invention, the step 3-4 comprises the following step of:

when the actual passing time $ATO_{i,j}$ of the flight at the sequencing key point satisfies that:

$ATO_{i,j} \in [CTO_{i,j} - \text{Res Div}, CTO_{i,j} + \text{Res Div}]$ indicating that the flight runs normally according to the sequencing time;

introducing the reference trajectory circle on the basis of the reference position point in the step 3-3, which is a circle taking the reference position point as a center point and R as a radius; wherein the calculation formula of the radius of the reference trajectory circle is:

$R = Velo(Pt_{i,x}) * \text{Res Div} \quad (18).$

In the present invention, the aircraft (airplane) is planned and guided according to the result of generating the reference trajectory circle in the step 3.

The method of the present invention is loaded and operated in a processing server of an air traffic control system.

Beneficial Effects

The method of the present invention can convert the abstract timing suggestion into an intuitive spatial position reference target, facilitating the air traffic controller to guide the aircraft more accurately according to a planned time generated by the arrival management system (AMAN), enhancing a time-based planning and operation ability of the air traffic controller, and laying a technical foundation for future implementation of TBO.

BRIEF DESCRIPTION OF THE DRAWINGS

The advantages of the above and/or other aspects of the present invention will become more apparent by further explaining the present invention with reference to the following drawings and detailed description.

DETAILED DESCRIPTION

The present invention is further explained with reference to the drawings and embodiments hereinafter.

Figure 1:
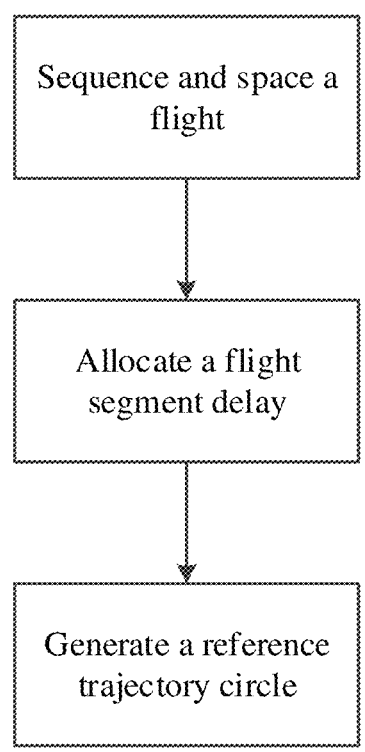
FIG. 1 is a general flow chart of the present invention.

As shown in FIG. 1, a method of the present invention comprises the following steps of:

step 1: sequencing and spacing a flight; and generating a sequencing time and a delay suggestion of the flight in each key point in a terminal area and each runway by using a flight sequencing technology;

step 2: allocating a flight segment delay; and predicting a flight status of the flight according to a current position and 4D trajectory information of the flight, and filtering a delay-consumed flight segment, and on that basis, and generating a flight segment delay allocation strategy with reference to an aircraft performance and sequencing information; and step 3: generating a reference trajectory circle; and generating a visual spatial position reference target according to the flight segment delay allocation result and an operation deviation limit, which provides a visual reference for an air traffic controller to guide the aircraft according to the sequencing time.

Step 1: sequencing and spacing the flight.

The function of this step is that: a flight sequencing algorithm can comprehensively consider various operation limits in a terminal area, and generate sequencing time and delay suggestions for the flight in each key point in the terminal area and airport runway, so as to ensure the safe, sequential and efficient circulation of a traffic flow. For the specific methods, please refer to a previous patent "Multi-efficiency Sequencing and Spacing Method for Arrival Flights in Airport with Multi-runways".

Figure 2:
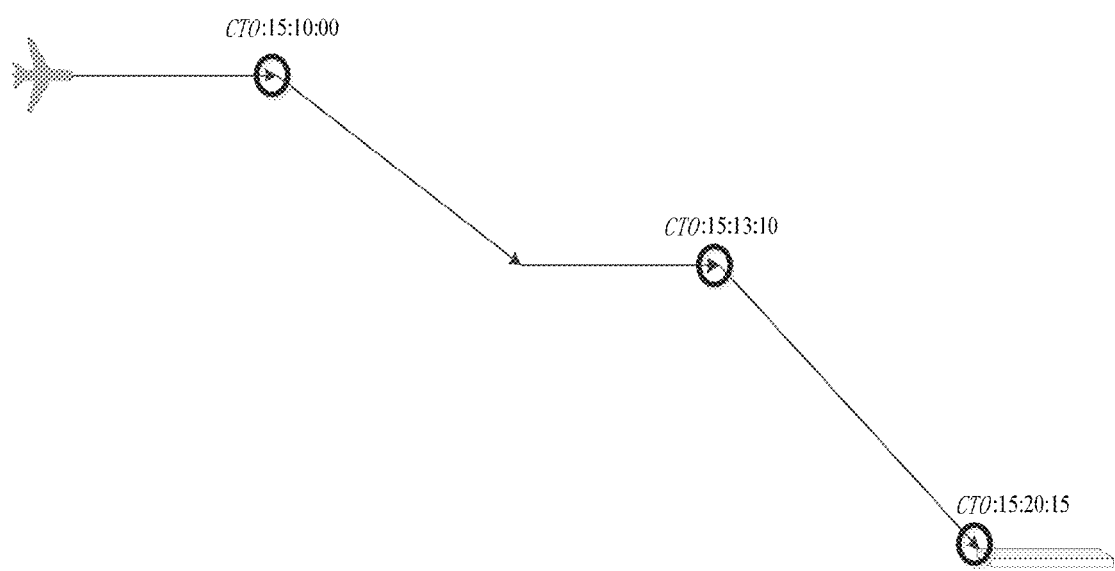
FIG. 2 is a schematic diagram showing sequencing key point information display of the present invention.

Note 1: the key point in the terminal area usually refers to a corridor entrance point, an internal convergence point or an attention point designated by the user, and the like, and an aircraft passing through this point may be allocated with a sequencing time. In this method, this kind of point in the flight trajectory (i.e., a 4D trajectory of the flight) and the airport runway are called sequencing key points. As shown by the circled points in FIG. 2, the airplane in the figure may pass through three sequencing key points from the current position to airport landing.

Note 2: the 4D trajectory information of the flight is generated by a 4D trajectory predicting technology, wherein the 4D trajectory predicting technology is a general technology used by the civil aviation industry to predict the flight trajectory.

Step 2: allocating the flight segment delay.

Figure 3:
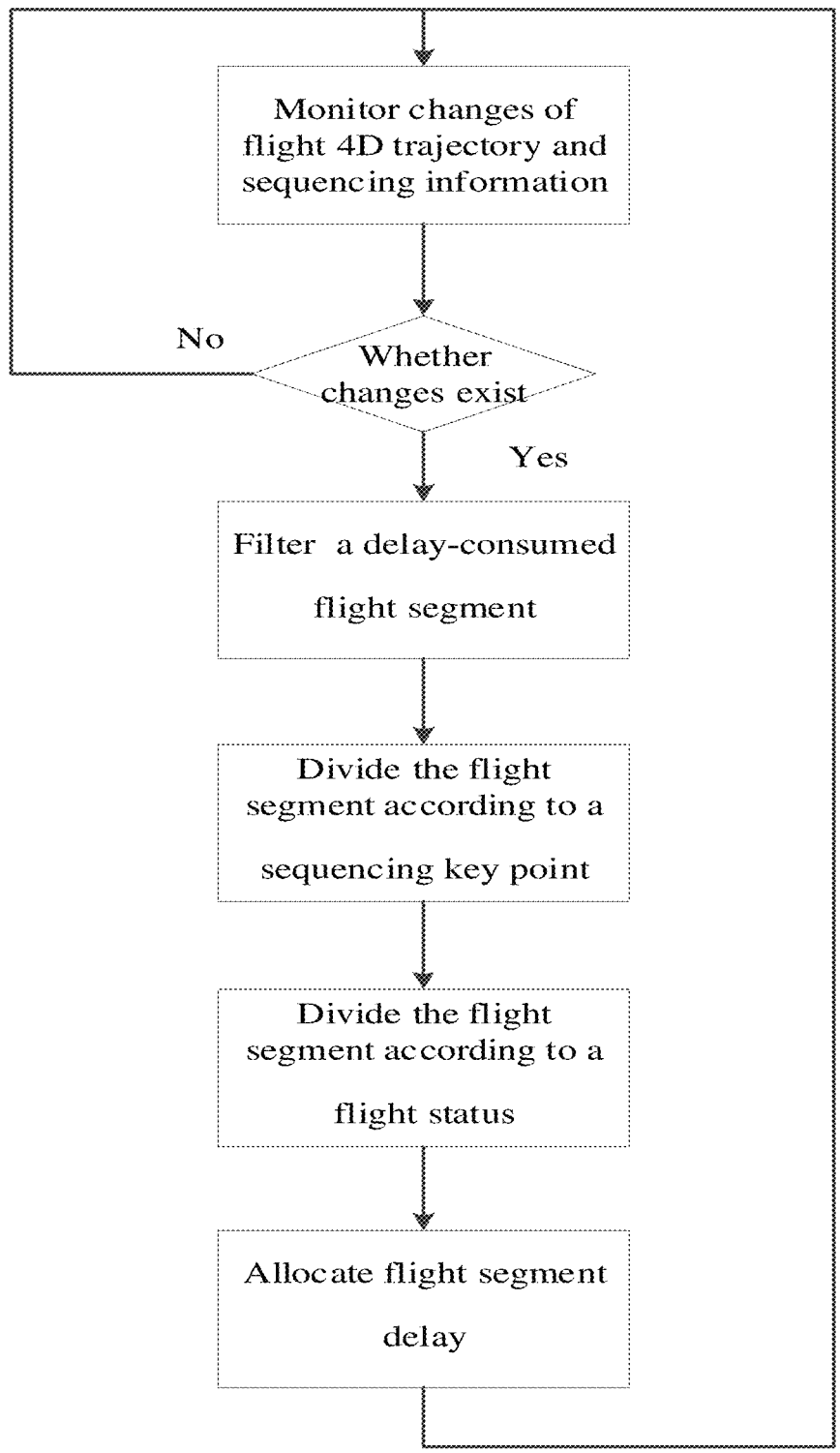
FIG. 3 is a schematic diagram a flight segment delay allocation processing flow of the present invention.

The function of this step is: to distribute the sequencing delay suggestions of the flight in each key point in the terminal area and each runway to each flight segment of the flight for absorption, so as to more accurately execute the sequencing time of the flight at the sequencing key point. Therefore, the processing flow of the predicting the flight status of the flight according to the current position and the 4D trajectory information of the flight, and filtering the delay-consumed flight segment, and on that basis, generating the flight segment delay allocation strategy with reference to the aircraft performance and the sequencing information is as shown in FIG. 3.

The following steps are comprised:

step 2-1: defining variables;

step 2-2: filtering the delay-consumed flight segment;

step 2-3: dividing the flight segment according to a sequencing key point;

step 2-4: dividing the flight segment according to the flight status; and step 2-5: allocating the flight segment delay.

Step 2-1: defining the variables:

SysTime: denoting a current time of a system;

$Flt_i$: denoting an $i^{th}$ flight;

$PtList_i$: denoting a flight trajectory point queue of the flight $Flt_i$, wherein the queue is generated according to a flight plan of the flight by using a 4D trajectory predicting technology and contains waypoints in a flight route and interpolation point information between waypoints;

$PtNum_i$: denoting a number of trajectory points in the flight trajectory point queue $PtList_i$ of the flight $Flt_i$;

$Pt_{i,j}$: denoting a $j^{th}$ trajectory point of the flight trajectory point queue $PtList_i$ of the flight $Flt_i$, wherein $Pt_{i,j} \in PtList_i$;

$ETO_{i,j}$: denoting an estimated passing time of the aircraft $Flt_i$ at $Pt_{i,j}$ and generated by the 4D trajectory predicting technology;

$CTO_{i,j}$: denoting a sequencing passing time of the aircraft $Flt_i$ at $Pt_{i,j}$, wherein an initial value is $ETO_{i,j}$; the sequencing time of the sequencing key point in the method is provided by the step 1; and sequencing time of other types of points is updated by the step;

$Div(CTO_{i,j})$: denoting a difference of the sequencing passing time $CTO_{i,j}$ of the aircraft $Flt_i$ at $Pt_{i,j}$ allocated in two adjacent computation periods, in a unit of second;

DivLimit: denoting an upper limit of the difference of the sequencing passing time of the aircraft at the sequencing key point allocated in adjacent computation periods, in a unit of second, which is set as 60 seconds in the method, and may be set by a user according to the needs thereof;

$Pt\,Pro_{i,j}$: denoting a sequencing attribute of the point $Pt_{i,j}$, wherein a value of 1 denotes that the point is a sequencing key point, and a value of 0 denotes others;

$PtDelay_{i,j}$: denoting an estimated passing time delay of the aircraft $Flt_i$ at $Pt_{i,j}$, in a unit of second;

[$Pt_{i,j}$, $Pt_{i,k}$]: denoting a flight segment from the point $Pt_{i,j}$ to a point $Pt_{i,k}$ in $PtList_i$, wherein $Pt_{i,j}$ denotes an origin of the flight segment, and $Pt_{i,k}$ denotes an end point of the flight segment;

$SegNum_{j,k}$: denoting a number of small flight segments contained in the flight segment [$Pt_{i,j}$, $Pt_{i,k}$];

$SegDis_{j,k}$: denoting a flight length of the aircraft $Flt_i$ at the flight segment [$Pt_{i,j}$, $Pt_{i,k}$];

$SegMinSpeed_{j,k}$: denoting a minimum safe flight speed of the aircraft $Flt_i$ at the flight segment [$Pt_{i,j}$, $Pt_{i,k}$], wherein the parameter is acquired according to the aircraft performance or an airspace operation limit;

$SegMaxSpeed_{j,k}$: denoting a maximum safe flight speed of the aircraft $Flt_i$ at the flight segment [$Pt_{i,j}$, $Pt_{i,k}$], wherein the parameter is acquired according to the aircraft performance or the airspace operation limit;

$Seg Pr o_{j,k}$: denoting a flight status of the aircraft $Flt_i$ at the flight segment [$Pt_{i,j}$, $Pt_{i,k}$], wherein a value of 1 denotes level flight, and a value of 0 denotes others;

$SegDelay_{j,k}$: denoting a delay value that needs to be consumed by the aircraft $Flt_i$ at the flight segment [$Pt_{i,j}$, $Pt_{i,k}$], in a unit of second;

$SegDelayTmp_{j,k}$: denoting a temporary variable of the delay that needs to be consumed by the aircraft $Flt_i$ at the flight segment [$Pt_{i,j}$, $Pt_{i,k}$] used in the calculating process of the method, and in a unit of second;

$SegMaxDelay_{j,k}$: denoting a maximum positive delay value capable of being consumed by the aircraft $Flt_i$ at the flight segment [$Pt_{i,j}$, $Pt_{i,k}$], in a unit of second; and $SegMaxAcc_{j,k}$: denoting a maximum negative delay value capable of being consumed by the aircraft $Flt_i$ at the flight segment [$Pt_{i,j}$, $Pt_{i,k}$], in a unit of second.

Step 2-2: filtering the delay-consumed flight segment:

In order to improve a stability of the reference trajectory circle generated by this method in periodic calculation (to reduce the problem that users cannot use the reference trajectory circle normally due to frequent hopping in the position of the reference trajectory circle changing with the time), and meanwhile, take into account the need of timely correction when there is a big deviation between the reference trajectory circle and the actual position of the aircraft, or when the sequencing time of the sequencing key point fluctuates greatly, the following ways are adopted in this method to filter the delay-consumed flight segment. The concept of the reference trajectory circle is described in the step 3.

Letting $Pt_{i,bgn}$ be an origin of the flight segments participating in delay consumption in the flight trajectory point queue $PtList_i$ of the flight $Flt_i$.

Step 2-2-1: positioning an actual flight segment at which the flight is currently located:

positioning the actual flight segment [$Pt_{i,cur}$, $Pt_{i,cur+1}$] at which the flight $Flt_i$ is currently located according to the estimated passing time $ETO_{i,j}$ of each point $Pt_{i,j}$ in the flight trajectory point queue $PtList_i$ of the flight $Flt_i$, and satisfying that $SysTime \in [ETO_{i,cur}, ETO_{i,cur+1}]$.

Step 2-2-2: positioning a reference flight segment at which the flight is currently located:

positioning the reference flight segment [$Pt_{i,ref}$, $Pt_{i,ref+1}$] at which the flight $Flt_i$ is currently located according to the sequencing passing time $CTO_{i,j}$ of each point $Pt_{i,j}$ in the flight trajectory point queue $PtList_i$ of the flight $Flt_i$, and satisfying that $SysTime \in [CTO_{i,ref}, CTO_{i,ref+1}]$;

Step 2-2-5: searching for an adjacent sequencing key point in a preceding flight segment:

letting $Pt_{i,pre}$ be the sequencing key point closest to a current position $Pt_{i,cur}$ in the preceding flight segment [$Pt_{i,1}$, $Pt_{i,cur}$] of the flight $Flt_i$;

letting $Pt_{i,tmp}$ be an intermediate variable of flight trajectory points of the flight $Flt_i$ in the calculation process of the method;

when satisfying that $\exists Pt_{i,tmp} \in [Pt_{i,1}, Pt_{i,cur}]$, such that $$Min\{(ETO_{i,cur}-ETO_{i,tmp}+1)*PtPro_{i,tmp}\}>0 \qquad (1)$$

letting $Pt_{i,pre}=Pt_{i,tmp}$, and continuously executing step 2-2-4; otherwise, letting $Pt_{i,pre}=\emptyset$, and skipping to step 2-2-5.

step 2-2-4: judging whether a sequencing key point exists between the actual position of the flight and the reference flight segment:

when satisfying that $ETO_{i,cur}>ETO_{i,ref}$ and $Pt_{i,pre} \in [Pt_{i,ref+1}, Pt_{i,cur}]$, letting $Pt_{i,bgn}=Pt_{i,pre}$, and skipping to step 2-2-7; otherwise, continuously executing step 2-2-5;

Step 2-2-5: searching for an adjacent sequencing key point in a subsequent flight segment:

letting $Pt_{i,PtNum_i}$ be the last point in the flight trajectory point queue $PtList_i$ of the flight $Flt_i$ letting $Pt_{i,aft}$ be the sequencing key point closest to the current position $Pt_{i,cur}$ in the subsequent flight segment [$Pt_{i,cur+1}$, $Pt_{i,PtNum_i}$] of the flight $Flt_i$;

when satisfying that $\exists Pt_{i,tmp} \in [Pt_{i,cur+1}, Pt_{i,PtNum_i}]$, such that $$Min\{(ETO_{i,tmp}-ETO_{i,cur})*PtPro_{i,tmp}\}>0 \qquad (2)$$

letting $Pt_{i,aft}=Pt_{i,tmp}$; otherwise, letting $Pt_{i,aft}=Pt_{i,PtNum_i}$, wherein $Pt_{i,PtNum_i}$ is the last point in $PtList_i$, i.e., an airport runway, and the airport runway is also set as the sequencing key point in the method.

Step 2-2-6: judging whether the sequencing time of the subsequent sequencing key point has a larger fluctuation:

calculating a difference $Div(CTO_{i,aft})$ between the currently allocated sequencing time and the allocated sequencing time during last calculation of the flight $Flt_i$ at the sequencing key point $Pt_{i,aft}$, and filtering the origin $Pt_{i,bgn}$ of the delay-consumed flight segment according to $Div(CTO_{i,aft})$; for the first operation, letting $Div(CTO_{i,aft})=0$:

$$Pt_{i,bgn} = \begin{cases} Pt_{i,ref}, & |Div(CTO_{i,aft})| < DivLimit \\ Pt_{i,cur}, & |Div(CTO_{i,aft})| \geq DivLimit \,\&\&\, Pt_{i,pre} == \emptyset \\ Pt_{i,pre}, & else \end{cases} \qquad (3)$$

Step 2-2-7: determining the delay-consumed flight segment:

for the flight $Flt_i$, the flight segments participating in delay consumption filtered in the method are all the subsequent flight segment from $Pt_{i,bgn}$ in the flight trajectory point queue $PtList_i$, which is [$Pt_{i,bgn}$, $Pt_{i,PtNum_i}$].

Step 2-2-8: updating a sequencing time of the origin of the delay-consumed flight segment:

$$CTO_{i,bgn} = \begin{cases} ETO_{i,bgn}, & Pt_{i,bgn} \neq Pt_{i,ref} \,\&\&\, ETO_{i,bgn} \leq SysTime \\ CTO_{i,bgn}, & else \end{cases} \qquad (4)$$

Figure 4:
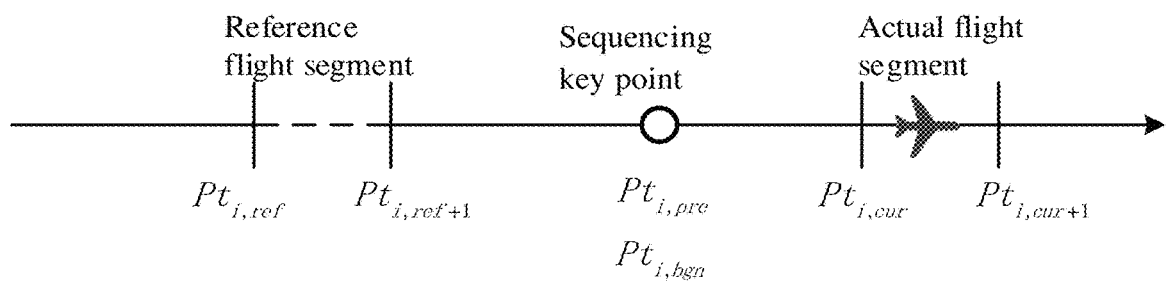
FIG. 4 is a schematic diagram of the first example of a delay-consumed flight segment filtering scenario of the present invention.

As shown in FIG. 4, the origin of the reference flight segment of the flight in the figure is $Pt_{i,ref}$, and the end point of the reference flight segment is $Pt_{i,ref+1}$, the origin of the actual flight segment is $Pt_{i,cur}$, and the end point of the actual flight segment is $Pt_{i,cur+1}$. The actual flight segment of the aircraft in the figure is ahead of (that is, closer to a destination airport) the reference flight segment, and the sequencing key point $Pt_{i,pre}$ exists between the origin $Pt_{i,cur}$ of the actual flight segment of the aircraft and the end point $Pt_{i,ref+1}$ of the reference flight segment, then the sequencing key point is used as the origin $Pt_{i,bgn}$ of the delay-consumed flight segment.

Figure 5:
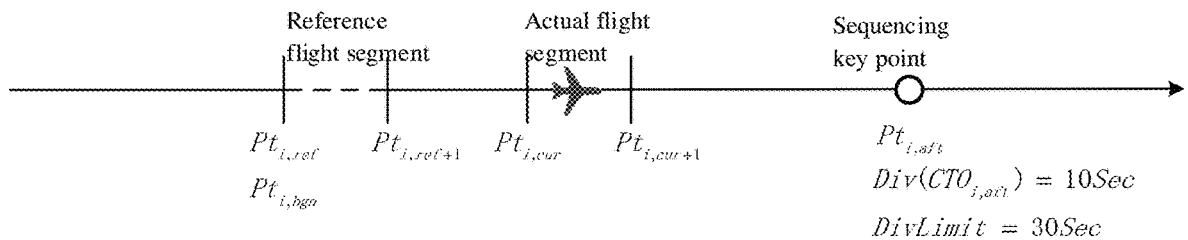
FIG. 5 is a schematic diagram of the second example of the delay-consumed flight segment filtering scenario of the present invention.

As shown in FIG. 5, if the sequencing key point does not exist between the actual flight segment of the aircraft in the figure and the reference flight segment, and the subsequent adjacent sequencing key point $Pt_{i,aft}$ satisfies that |Div$(CTO_{i,aft})$|<DivLimit, then the origin $Pt_{i,ref}$ of the reference flight segment in FIG. 5 is used as the origin $Pt_{i,bgn}$ of the delay-consumed flight segment.

Figure 6:
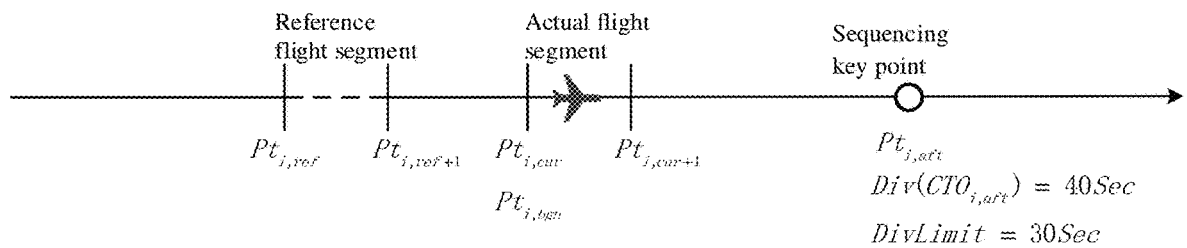
FIG. 6 is a schematic diagram of the third example of the delay-consumed flight segment filtering scenario of the present invention.

As shown in FIG. 6, the sequencing key point does not exist in the preceding flight segment of the current position of the aircraft, i.e., $Pt_{i,pre}==\emptyset$ is satisfied, and the subsequent adjacent sequencing key point $Pt_{i,aft}$ satisfies that |Div$(CTO_{i,aft})$|≥DivLimit, then the origin $Pt_{i,cur}$ of the actual flight segment in FIG. 6 is used as the origin $Pt_{i,bgn}$ of the delay-consumed flight segment.

Figure 7:
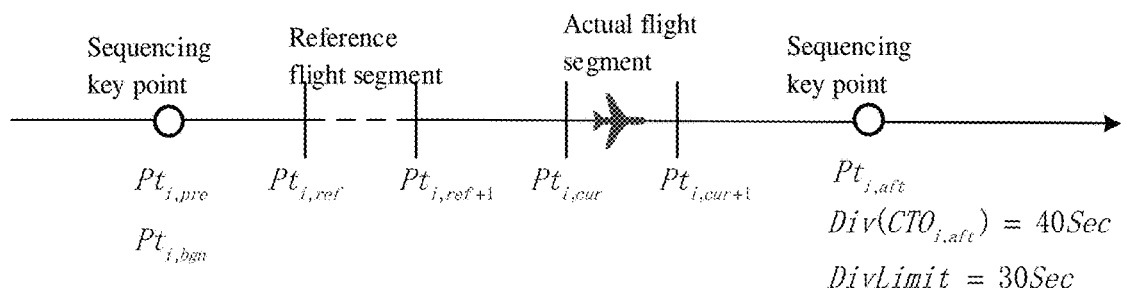
FIG. 7 is a schematic diagram of the fourth example of the delay-consumed flight segment filtering scenario of the present invention.

As shown in FIG. 7, the adjacent sequencing key point $Pt_{i,pre}$ exists in the preceding flight segment of the current position of the aircraft in the figure, and the subsequent adjacent sequencing key point $Pt_{i,aft}$ satisfies that |Div$(CTO_{i,aft})$|≥DivLimit, then the sequencing key point $Pt_{i,pre}$ in FIG. 7 is used as the origin $Pt_{i,bgn}$ of the delay-consumed flight segment.

Note 3: for the first calculation, letting a sequencing time of all the non-sequencing key points $Pt_{i,j}$ in $PtList_i$ be $CTO_{i,j}=ETO_{i,j}$; otherwise, using the last operation result for $CTO_{i,j}$ of all the non-sequencing key points herein.

Step 2-3: dividing the flight segment according to a sequencing key point:

according to sequencing key point information in the flight trajectory point queue $PtList_i$ of the aircraft $Flt_i$, dividing the delay-consumed flight segment $[Pt_{i,bgn}, Pt_{i,PtNum_i}]$ selected in the step 2-2 into a plurality of small flight segments with overlapped boundary points.

The specific process is as follows:

1): setting a starting point of a sub-segment to be divided in the flight trajectory point queue $PtList_i$ of the flight;

2): searching for the closest sequencing key point after $Pt_{i,m}$ from $PtList_i$, which is used as an end point of the sub-segment to be divided, and denoted with $Pt_{i,n}$, then the divided sub-flight segment is $[Pt_{i,m}, Pt_{i,n}]$; and 3): letting $Pt_{i,m}=Pt_{i,n}$, and repeating the step 2-3-2 till the last point in $PtList_i$.

Then, all the sub-flight segments divided in the step need to satisfy the following conditions:

1) $[Pt_{i,m}, Pt_{i,n}] \neq \emptyset$
2) $[Pt_{i,m}, Pt_{i,n}] \subset [Pt_{i,bgn}, Pt_{i,PtNum_i}]$ and
3) $\cup [Pt_{i,m}, Pt_{i,n}] = [Pt_{i,bgn}, Pt_{i,PtNum_i}]$.

Figure 8:
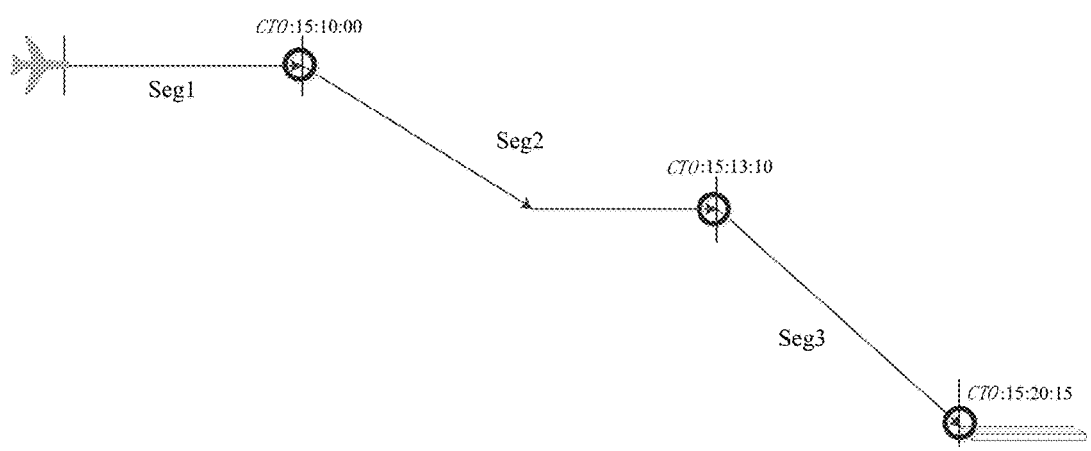
FIG. 8 is a schematic diagram of dividing a flight segment according to a sequencing key point of the present invention.

Taking FIG. 8 for example, the delay-consumed flight segment of the flight $Flt_i$ is divided into three segments according to the key point information participating in sequencing, which are respectively denoted with Seg1, Seg2, and Seg3.

Step 2-4: dividing the flight segment according to the flight status:

In practice, in view of the operation complexity and safety of the aircraft in a maneuvering stage such as climbing or descending, this method allocates the delay absorption process to the level flight stage of the aircraft. Therefore, each flight segment $[Pt_{i,m}, Pt_{i,n}]$ divided in the step 2-3 of the method is subdivided according to the flight status of the aircraft in the flight segment, wherein the method specific is as follows:

dividing the flight segment $[Pt_{i,m}, Pt_{i,n}]$ into a plurality of small flight segments $[Pt_{i,o}, Pt_{i,p}]$ with overlapped boundary points according to the flight status of the aircraft, wherein movement status of the flight $Flt_i$ in each small flight segment are consistent; and synchronously recording a flight status tag Seg Pr $o_{o,p}$ of the flight $Flt_i$ in each small flight segment $[Pt_{i,o}, Pt_{i,p}]$; and recording a number of the small flight segments divided from the flight segment $[Pt_{i,m}, Pt_{i,n}]$ in the step as $SegNum_{m,n}$, wherein all the small flight segments satisfy the following conditions:

1) $[Pt_{i,o}, Pt_{i,p}] \neq \emptyset$
2) $[Pt_{i,o}, Pt_{i,p}] \subset [Pt_{i,m}, Pt_{i,n}]$ and
3) $\cup_1^{SegNum_{m,n}}[Pt_{i,o}, Pt_{i,p}]=[Pt_{i,m}, Pt_{i,n}]$.

Figure 9:
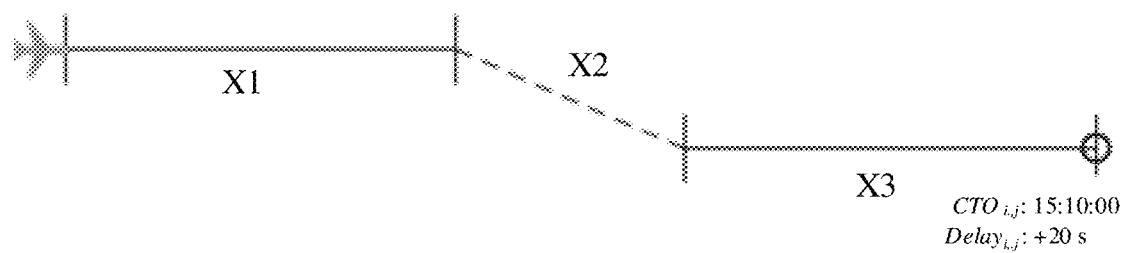
FIG. 9 is a schematic diagram of dividing a flight segment according to a flight status of the present invention.

As shown in FIG. 9, this figure shows a vertical section of the flight trajectory of the aircraft in a certain flight segment. According to the movement status of the aircraft in the flight segment, the flight segment is divided into three segments, wherein two level flight segments X1 and X3 are denoted with solid lines and one descending flight segment X2 is denoted with dotted lines. This method only selects the level flight segment in the figure for delay allocation.

Step 2-5: allocating the flight segment delay:

In this step, the sequencing delay of the aircraft at the sequencing key point is allocated to each flight segment according to the flight status and the flight segment length of the aircraft on each flight segment and the aircraft performance, which is convenient for the delay absorption process to be safer and more efficient.

The following processing is performed in turn for each sub-flight segment $[Pt_{i,m}, Pt_{i,n}]$ of the flight $Flt_i$ divided in the step 2-3.

Step 2-5-1: calculating a total delay of the flight segment:

calculating the total delay that needs to be consumed by the flight $Flt_i$ at the flight segment $[Pt_{i,m}, Pt_{i,n}]$ as:

$$SegDelay_{m,n}=(CTO_{i,n}-ETO_{i,n})-(CTO_{i,m}-ETO_{i,m}) \quad (5)$$

Step 2-5-2: calculating an upper limit of the flight segment delay:

The method estimates the upper limit of the delay of the aircraft at the flight segment from a perspective of performance according to a level flight distance, a minimum level flight speed and a maximum level flight speed of the aircraft in the flight segment, and a user may adjust as needed.

Referring to the step 2-4, and letting each small flight segment divided in the flight segment $[Pt_{i,m}, Pt_{i,n}]$ be $[Pt_{i,o}, Pt_{i,p}]$, then a maximum positive delay capable of being allocated by the flight $Flt_i$ at each small flight segment is:

$$SegMaxDelay_{o,p} = \left(\frac{SegDis_{o,p}}{SegMinSpeed_{o,p}} - (ETO_{i,p} - ETO_{i,0})\right) * SegPro_{o,p} \quad (6)$$

a maximum advance value capable of being allocated by the flight $Flt_i$ at the small flight segment $[Pt_{i,o}, Pt_{i,p}]$ is:

$$SegMaxAcc_{o,p} = \left((ETO_{i,p} - ETO_{i,0}) - \frac{SegDis_{o,p}}{SegMaxSpeed_{o,p}}\right) * SegPro_{o,p} \quad (7)$$

then, the upper limit of the delay capable of being allocated by the flight $Flt_i$ at the small flight segment $[Pt_{i,m}, Pt_{i,n}]$ is:

$$SegMaxDelay_{m,n}=\Sigma_1^{SegNum_{m,n}}SegMaxDelay_{o,p} \quad (8)$$

$$SegMaxAcc_{m,n}=\Sigma_1^{SegNum_{m,n}}SegMaxAcc_{o,p} \quad (9)$$

Step 2-5-3: judging whether the flight segment delay is excessive:

When any of the following conditions are satisfied, it is indicated that the delay of the flight Fits at the flight segment $[Pt_{i,m}, Pt_{i,n}]$ is excessive, needing to prompt an air traffic controller that the flight needs to be manually guided for delay absorption, and returning to step 2-5-1 to continuously processing next sub-flight segment. Otherwise, it is indicated that the delay is within an acceptable range, and subsequent steps are continued.

Excessive flight segment delay conditions are as follows:
1) $SegDelay_{m,n} > 0 \&\& SegDelay_{m,n} > SegMaxDelay_{m,n}$ and
2) $SegDelay_{m,n} < 0 \&\& |SegDelay_{m,n}| > SegMaxAcc_{m,n}$.

Step 2-5-4: allocating the flight segment delay:

In order to reduce instructions issued by the air traffic controller and actions taken by a pilot in the delay absorption process, the flight segment delay allocation result should be as uniform as possible. This method allocates a delay for each level flight segment according to a distance and a delay absorption capacity of each level flight segment.

Letting $SegDelayTmp_{m,n}$ be the delay needing to be received by the flight $Flt_i$ at the flight segment $[Pt_{i,m}, Pt_{i,n}]$ in the step, and $SegDelayTmp_{m,n}=SegDelay_{m,n}$; and initializing the delay of each small flight segment $[Pt_{i,o}, Pt_{i,p}]$ in the flight segment $[Pt_{i,m}, Pt_{i,n}]$, and letting $SegDelay_{o,p}=0$.

Step 2-5-4-1: allocating the flight segment delay:

for each small flight segment $[Pt_{i,o}, Pt_{i,p}]$ in the flight segment $[Pt_{i,j}, Pt_{i,n}]$, the calculating method for allocating the delay according to the level flight distance of each small flight segment is as follows:

$$SegDelay_{o,p} = SegDelay_{o,p} + SegDelayTmp_{m,n} * \frac{SegDis_{o,p} * SegPro_{o,p}}{\sum_{1}^{SegNum_{m,n}} SegDis_{o,p} * SegPro_{o,p}} \quad (10)$$

In order to ensure the feasibility of the flight segment delay allocation result, correcting is made according to a flight segment delay absorption capacity, wherein the method is as follows:

$$SegDelay_{o,p} = \begin{cases} SegMaxDelay_{o,p}, & SegDelay_{o,p} > SegMaxDelay_{o,p} \\ -1 * SegMaxAcc_{o,p}, & SegDelay_{o,p} < (-1 * SegMaxAcc_{o,p}) \\ SegDelay_{o,p}, & else \end{cases} \quad (11)$$

Step 2-5-4-2: detecting a delay allocation result:

detecting whether any delay which is not allocated exists in the flight segment $[Pt_{i,m}, Pt_{i,n}]$, wherein the method is as follows:

$$SegDelayTmp_{m,n}=SegDelay_{m,n}-\sum_1^{SegNum_{m,n}}SegDelay_{o,p} \quad (12)$$

when satisfying that $SegDelayTmp_{m,n}=0$, indicating that the delay of the flight segment $[Pt_{i,m}, Pt_{i,n}]$ is completely allocated, and continuing step 2-5-5; otherwise, returning to step 2-5-4-1, and updating the flight segment delay allocation result.

Step 2-5-5: allocating a waypoint delay:

calculating a sequencing time and a delay of the flight $Flt_i$ in a non-sequencing key point of the flight segment $[Pt_{i,m}, Pt_{i,n}]$ according to the delay $SegDelay_{o,p}$ allocated for the flight $Flt_i$ at each small flight segment $[Pt_{i,o}, Pt_{i,p}]$ in the flight segment $[Pt_{i,m}, Pt_{i,n}]$ in the step 2-5-4, wherein the sequencing time and the delay of the sequencing key point are generated by the step 1; and starting from an origin of the flight segment $[Pt_{i,m}, Pt_{i,n}]$, for any point $Pt_{i,q}$ in the flight segment, positioning a small flight segment that the point belongs to, i.e. $Pt_{i,q} \in [Pt_{i,o}, Pt_{i,p}]$, then the delay needing to be allocated to the point is as follows:

$$PtDelay_{i,q} = \begin{cases} \frac{SegDis_{q-1,q}}{SegDis_{o,p}} * SegDelay_{o,p} + & Pt_{q-1} \in [Pt_{i,o}, Pt_{i,p}] \&\& \\ PtDelay_{i,q-1}, & PtPro_{i,q}=0 \\ CTO_{i,q} - ETO_{i,q}, & else \end{cases} \quad (13)$$

the sequencing time of the point $Pt_{i,q}$ is:

$$CTO_{i,q}=ETO_{i,q}+PtDelay_{i,q} \quad (14).$$

Figure 10:
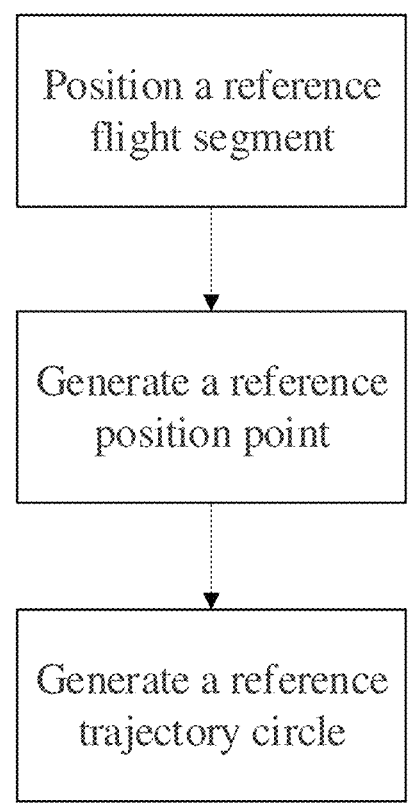
FIG. 10 is a schematic diagram showing a processing flow of generating a reference trajectory circle of the present invention.

Step 3: generating a reference trajectory circle:

The function of this step is: to generate a visual spatial position reference target according to the flight segment delay allocation result and an operation deviation limit, solve an abstract problem of the flight sequencing time, and enhance a time-based operation ability of the air traffic controller. The processing flow of generating the reference trajectory circle is shown in FIG. 10.

The following steps are comprised:
step 3-1: defining variables;
step 3-2: positioning the reference flight segment;
step 3-3: generating a reference position point; and
step 3-4: generating the reference trajectory circle;

Step 3-1: defining the variables:

$Lat(Pt_{i,j})$: denoting a latitude of the flight $Flt_i$ at the waypoint $Pt_{i,j}$;

$Lon(Pt_{i,j})$: denoting a longitude of the flight $Flt_i$ at the waypoint $Pt_{i,j}$;

$Velo(Pt_{i,j})$: denoting a speed suggestion of the flight $Flt_i$ passing through the waypoint $Pt_{i,j}$;

Res Div: denoting a deviation limit between an actual passing time at the sequencing key point and the sequencing passing time of the flight, which may be set by the user as needed;

$ATO_{i,j}$: denoting an actual passing time of the flight $Flt_i$ at the waypoint $Pt_{i,j}$; and R: denoting a radius of the reference trajectory circle.

Step 3-2: positioning the reference flight segment:

re-positioning the reference flight segment $[Pt_{i,ref}, Pt_{i,ref+1}]$ at which the flight is $Flt_i$ currently located according to the sequencing passing time $CTO_{i,j}$ of each point $Pt_{i,j}$ in the flight trajectory point queue $PtList_i$ of the flight $Flt_i$ calculated in the step 2-5-5, and satisfying that $SysTime \in [CTO_{i,ref}, CTO_{i,ref+1}]$.

Step 3-3: generating the reference position point:

An interval between two adjacent points in the flight trajectory point queue $PtList_i$ of the flight generated by 4D trajectory predicting technology is usually controlled at a second level (for example, 8 seconds). Although the interval is not large, it is not enough to support a real-time update demand. On the basis of this reference flight segment, this method uses a difference method to approximately solve the real-time reference position point of the aircraft at the current time of the system, so as to meet practical industrial application requirements.

Letting Pt be the current reference position point of the flight $Flt_i$, and letting the current reference flight segment at which the flight $Flt_i$ is located be $[Pt_{i,ref}, Pt_{i,ref+1}]$ with reference to the step 3-2, then the method for calculating related information of the reference position point is as follows:

$$Lat(Pt_{i,x}) = \tag{15}$$
$$Lat(Pt_{i,ref}) + \frac{SysTime - CTO_{i,ref}}{CTO_{i,ref+1} - CTO_{i,ref}} * (Lat(Pt_{i,ref+1}) - Lat(Pr_{i,ref}))$$

$$Lon(Pt_{i,x}) = \tag{16}$$
$$Lon(Pt_{i,ref}) + \frac{SysTime - CTO_{i,ref}}{CTO_{i,ref+1} - CTO_{t,ref}} * (Lon(Pt_{i,ref+1}) - Lon(Pt_{i,ref}))$$

$$Velo(Pt_{i,x}) = \frac{SegDis_{ref,ref+1}}{CTO_{i,ref+1} - CTO_{i,ref}}. \tag{17}$$

Step 3-4: generating the reference trajectory circle:

From the perspective of practical application, it is usually very difficult for the air traffic controller to guide the aircraft to pass through the sequencing key point precisely according to the sequencing time of the sequencing key point generated in the step 1. Therefore, a deviation limit Res Div (for example, 10 seconds) is usually set manually at the sequencing key point. As long as the actual passing time $ATO_{i,j}$ of the flight at the sequencing key point satisfies that $ATO_{i,j} \in [CTO_{i,j}-\text{Res Div}, CTO_{i,j}+\text{Res Div}]$, it means that the flight is running normally according to the sequencing time.

Figure 11:
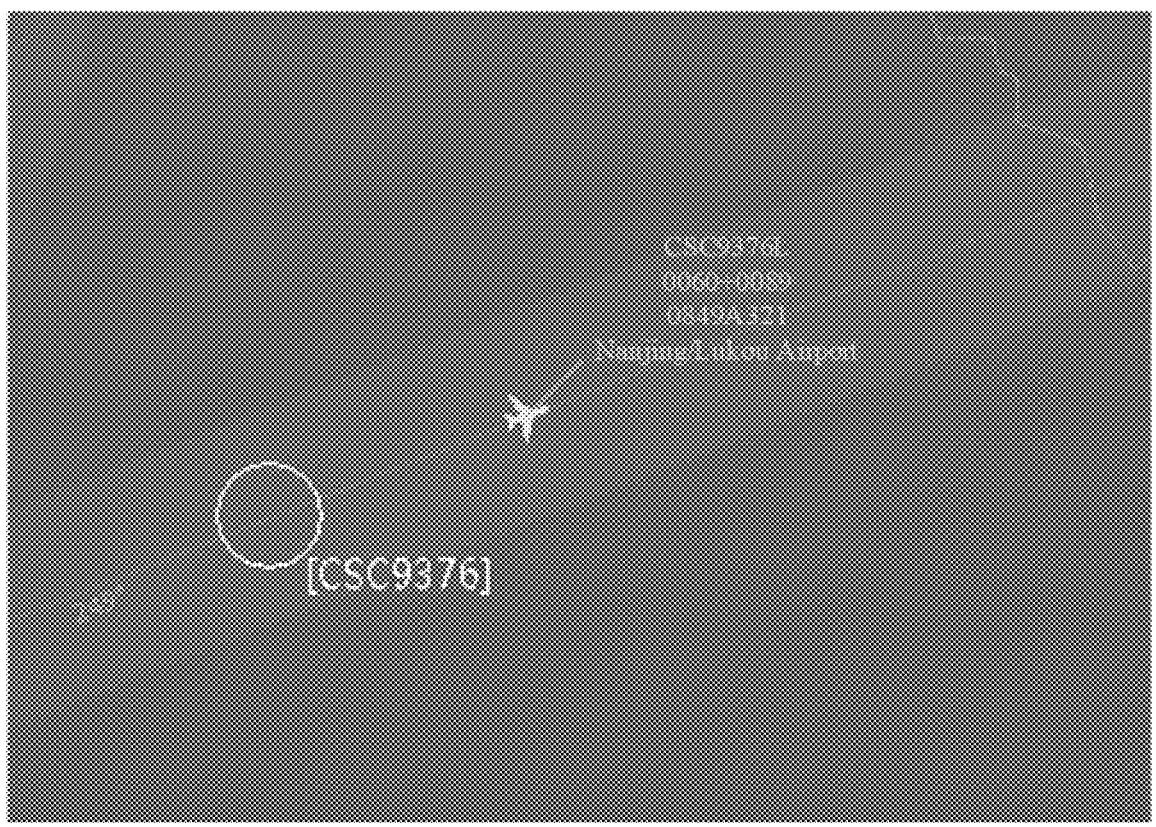
FIG. 11 is an application example diagram of a reference trajectory circle of an aircraft of the present invention.

Therefore, this method introduces the concept of the reference trajectory circle based on the reference position point in the step 3-3, that is, a circle with the reference position point as a center point and R as a radius. As shown in FIG. 11, an aircraft icon in the figure indicates a current actual position of flight CSC9376, while a circle with a flag of the flight number in the figure indicates a reference trajectory circle of the flight. The reference trajectory circle of the flight in the figure lags behind the actual position of the flight, indicating that the flight is flying too fast at present and needs to be adjusted according to the sequencing time and deviation limit of the flight at the key sequencing point.

The calculation formula of the radius of the reference trajectory circle is:

$$R = Velo(Pt_{i,x}) * \text{Res Div} \tag{18}.$$

In actual operation, if the air traffic controller can guide the aircraft into the corresponding reference trajectory circle, the airplane can be guided to pass through the sequencing key point on the premise of satisfying the deviation limit. This method can provide a time-based planning and guidance ability for air traffic controller, and provide technical support for future TBO operation.

The aircraft (airplane) is planned and guided according to the result of the reference trajectory circle generated in the step 3.

The time-space conversion method of flight sequencing information of this embodiment is loaded and operated in a processing server of an air traffic control system (ATC system).

In a specific implementation, the present application provides a computer storage medium and a corresponding data processing unit, wherein the computer storage medium is capable of storing a computer program, and the computer program, when executed by the data processing unit, can run the inventive contents of the time-space conversion method of flight sequencing information provided by the present invention and some or all steps in various embodiments. The storage medium may be a magnetic disk, an optical disk, a Read Only Storage (ROM) or a Random Access Storage (RAM), and the like.

Those skilled in the art can clearly understand that the technical solutions in the embodiments of the present invention can be realized by means of a computer program and a corresponding general hardware platform thereof. Based on such understanding, the essence of the technical solutions in the embodiments of the present invention or the part contributing to the prior art, may be embodied in the form of a computer program, i.e., a software product. The computer program, i.e., the software product is stored in a storage medium comprising a number of instructions such that a device (which may be a personal computer, a server, a singlechip, a MUU or a network device, and the like) comprising the data processing unit executes the methods described in various embodiments or some parts of the embodiments of the present invention.

The present invention provides an idea and a process for the time-space conversion method of flight sequencing information. There are many methods and ways to realize the technical solutions. The above is only the preferred embodiments of the present invention. It should be pointed out that those of ordinary skills in the art can make some improvements and embellishments without departing from the principle of the present invention, and these improvements and embellishments should also be regarded as falling with the scope of protection of the present invention. All the unspecified components in the embodiments can be realized by the prior art.

What is claimed is:

1. A time-space conversion method of flight sequencing information, comprising a computer readable medium operable on a computer with memory for the time-space conversion method, and comprising program instructions for executing the following steps of:
   step 1: sequencing and spacing a flight; and generating a sequencing time and a delay suggestion of the flight in each key point in a terminal area and each runway;
   step 2: allocating a flight segment delay; and predicting a flight status of the flight according to a current position and 4D trajectory information of the flight, and filtering a delay-consumed flight segment, and on that basis, generating a flight segment delay allocation strategy with reference to an aircraft performance and sequencing information, and obtaining a flight segment delay allocation result; wherein the step 2 comprises: predicting the flight status of the flight according to the current position and the 4D trajectory information of the flight, and filtering the delay-consumed flight segment, and on that basis, generating the flight segment delay allocation strategy with reference to the aircraft performance and the sequencing information, comprising the following steps of:
   step 2-1: defining variables;
   step 2-2: filtering the delay-consumed flight segment; wherein the step 2-2 comprises the following steps of:
   letting $Pt_{i,bgn}$ be an origin of the flight segments participating in delay consumption in the flight trajectory point queue $PtList_i$ of the flight $Flt_i$, and bgn denotes a serial number of the point $Pt_{i,bgn}$ in the queue $PtList_i$;
   step 2-1-1: positioning an actual flight segment at which the flight is currently located:
   positioning the actual flight segment $[Pt_{i,cur}, Pt_{i,cur+1}]$ at which the flight $Flt_i$ is currently located according to the estimated passing time $ETO_{i,j}$ of each point $Pt_{i,j}$ in the flight trajectory point queue $PtList_i$ of the flight $Flt_i$, and satisfying that $SysTime \in [ETO_{i,cur}, ETO_{i,cur+1}]$; wherein, $Pt_{i,cur}$ denotes an origin of the actual flight segment at which the flight $Flt_i$ is currently located, and $Pt_{i,cur+1}$ denotes an end point of the actual flight segment at which the flight $Flt_i$ is currently located; cur denotes a serial number of the point $Pt_{i,cur}$ in the queue $PtList_i$, and cur+1 denotes a serial number of the point $Pt_{i,cur+1}$ in the queue $PtList_i$; $ETO_{i,cur}$ denotes an estimated passing time of the flight $Flt_i$ at the point $Pt_{i,cur}$, and $ETO_{i,cur+1}$ denotes an estimated passing time of the flight $Flt_i$ at the point $Pt_{i,cur+1}$;

step 2-2-2: positioning a reference flight segment at which the flight is currently located:

positioning the reference flight segment $[Pt_{i,ref}, Pt_{i,ref+1}]$ at which the flight $Flt_i$ is currently located according to the sequencing passing time $CTO_{i,j}$ of each point $Pt_{i,j}$ in the flight trajectory point queue $PtList_i$ of the flight $Flt_i$, and satisfying that $SysTime \in [CTO_{i,ref}, CTO_{i,ref+1}]$; wherein, $Pt_{i,ref}$ denotes an origin of the reference flight segment at which the flight $Flt_i$ is currently located, and $Pt_{i,ref+1}$ denotes an end point of the reference flight segment at which the flight $Flt_i$ is currently located; ref denotes a serial number of the point $Pt_{i,ref}$ in the queue $PtList_i$, and ref+1 denotes a serial number of the point $Pt_{i,ref+1}$ in the queue $PtList_i$; $CTO_{i,ref}$ denotes a sequencing passing time of the flight $Flt_i$ at the point $Pt_{i,ref}$, and $CTO_{i,ref+1}$ denotes a sequencing passing time of the flight $Flt_i$ at the point $Pt_{i,ref+1}$;

step 2-2-3: searching for an adjacent sequencing key point in a preceding flight segment:

letting $Pt_{i,pre}$ be the sequencing key point closest to a current position $Pt_{i,cur}$ in the preceding flight segment $[Pt_{i,1}, Pt_{i,cur}]$ of the flight $Flt_i$, wherein Pre denotes a serial number of the point $Pt_{i,pre}$ in the queue $PtList_i$;

letting $Pt_{i,tmp}$ be an intermediate variable of flight trajectory points of the flight $Flt_i$ in the calculation process of the method, wherein tmp denotes a serial number of the point $Pt_{i,tmp}$ in the queue $PtList_i$;

when satisfying that $\exists Pt_{i,tmp} \in [Pt_{i,1}, Pt_{i,cur}]$, and satisfying:

$$\text{Min}\{(ETO_{i,cur}-ETO_{i,tmp}+1)*PtPro_{i,tmp}\} > 0 \qquad (1)$$

letting $Pt_{i,pre}=Pt_{i,tmp}$, and continuously executing step 2-2-4; otherwise, letting $Pt_{i,pre}=\emptyset$, and executing step 2-2-5;

step 2-2-4: judging whether a sequencing key point exists between the actual position of the flight and the reference flight segment:

when satisfying that $ETO_{i,cur} > ETO_{i,ref}$ and $Pt_{i,pre} \in [Pt_{i,ref+1}, Pt_{i,cur}]$, letting $Pt_{i,bgn}=Pt_{i,pre}$, and executing step 2-2-7; otherwise, continuously executing step 2-2-5;

step 2-2-5: searching for an adjacent sequencing key point in a subsequent flight segment:

letting $Pt_{i,PtNum_i}$ be the last point in the flight trajectory point queue $PtList_i$ of the flight $Flt_i$;

letting $Pt_{i,aft}$ be the sequencing key point closest to the current position $Pt_{i,cur}$ in the subsequent flight segment $[Pt_{i,cur+1}, Pt_{i,PtNum_i}]$ of the flight $Flt_i$, wherein aft denotes a serial number of the point $Pt_{i,aft}$ in the queue $PtList_i$;

when satisfying that $\exists Pt_{i,tmp} \in [Pt_{i,cur+1}, Pt_{i,PtNum_i}]$ and satisfying:

$$\text{Min}\{(ETO_{i,tmp}-ETO_{i,cur})*PtPro_{i,tmp}\} > 0 \qquad (2)$$

letting $Pt_{i,aft}=Pt_{i,tmp}$; otherwise, letting $Pt_{i,aft}=Pt_{i,PtNum_i}$;

step 2-2-6: judging whether the sequencing time of the subsequent sequencing key point has a certain fluctuation, wherein the method comprises:

calculating a difference $Div(CTO_{i,aft})$ between the currently allocated sequencing time and the allocated sequencing time during last calculation of the flight $Flt_i$ at the sequencing key point $Pt_{i,aft}$, and filtering the origin $Pt_{i,bgn}$ of the delay-consumed flight segment according to $Div(CTO_{i,aft})$, wherein the method is as follows:

for the first operation, letting $Div(CTO_{i,aft})=0$;

$$Pt_{i,bgn} = \begin{cases} Pt_{i,ref}, & |Div(CTO_{i,aft})| < DivLimit \\ Pt_{i,cur}, & |Div(CTO_{i,aft})| \geq DivLimit \,\&\&\, Pt_{i,pre} == \emptyset; \\ Pt_{i,pre}, & \text{else} \end{cases} \qquad (3)$$

step 2-2-7: determining the delay-consumed flight segment:

for the flight $Flt_i$, the filtered flight segments participating in delay consumption are all the subsequent flight segment from $Pt_{i,bgn}$ in the flight trajectory point queue $PtList_i$, which is $[Pt_{i,bgn}, Pt_{i,PtNum_i}]$; and step 2-2-8: updating a sequencing time of the origin of the delay-consumed flight segment:

$$CTO_{i,bgn} = \begin{cases} ETO_{i,bgn}, & Pt_{i,bgn} \neq Pt_{i,ref} \,\&\&\, ETO_{i,bgn} \leq SysTime \\ CTO_{i,bgn}, & \text{else} \end{cases} \qquad (4)$$

for the first calculation, letting a sequencing time of all non-sequencing key points $Pt_{i,j}$ in $PtList_i$ be $CTO_{i,j}=ETO_{i,j}$; otherwise, using the last operation result for $CTO_{i,j}$ of all the non-sequencing key points step 2-3: dividing the flight segment according to a sequencing key point;

step 2-4: dividing the flight segment according to the flight status; and step 2-5: allocating the flight segment delay to obtain the flight segment delay allocation result;

step 3: generating a reference trajectory circle; and generating a visual spatial position reference target according to the flight segment delay allocation result and an operation deviation limit; and step 4: the aircraft is controlled by the time-space conversion method for taking off or landing.

2. The time-space conversion method of flight sequencing information according to claim 1, wherein the defining the variables in the step 2-1 comprises:

SysTime: denoting a current time of a system;

$Flt_i$: denoting an $i^{th}$ flight;

$PtList_i$: denoting a flight trajectory point queue of the flight $Flt_i$, wherein the queue is generated according to a flight plan of the flight and contains waypoints in a flight route and interpolation point information between waypoints;

$PtNum_i$: denoting a number of trajectory points in the flight trajectory point queue $PtList_i$ of the flight $Flt_i$;

$Pt_{i,j}$: denoting a $j^{th}$ trajectory point of the flight trajectory point queue $PtList_i$ of the flight $Flt_i$, wherein $Pt_{i,j} \in PtList_i$;

$ETO_{i,j}$: denoting an estimated passing time of the aircraft $Flt_i$ at $Pt_{i,j}$;

$CTO_{i,j}$: denoting a sequencing passing time of the aircraft $Flt_i$ at $Pt_{i,j}$, wherein an initial value is $ETO_{i,j}$;

Div($CTO_{i,j}$): denoting a difference of the sequencing passing time $CTO_{i,j}$ of the aircraft $Flt_i$ at $Pt_{i,j}$ allocated in two adjacent computation periods;

DivLimit: denoting an upper limit of the difference of the sequencing passing time of the aircraft at the sequencing key point allocated in adjacent computation periods;

Pt Pr $o_{i,j}$: denoting a sequencing attribute of the point $Pt_{i,j}$, wherein a value of 1 denotes that the point is a sequencing key point, and a value of 0 denotes others;

$PtDelay_{i,j}$: denoting an estimated passing time delay of the aircraft $Flt_i$ at $Pt_{i,j}$;

$[Pt_{i,j}, Pt_{i,k}]$: denoting a flight segment from the point $Pt_{i,j}$ to a point $Pt_{i,k}$ in $PtList_i$, wherein $Pt_{i,j}$ denotes an origin of the flight segment, $Pt_{i,k}$ denotes an end point of the flight segment, and k denotes a serial number of the point $Pt_{i,k}$ in the queue $PtList_i$;

$SegNum_{j,k}$: denoting a number of flight segments contained in the flight segment $[Pt_{i,j}, Pt_{i,k}]$;

$SegDis_{j,k}$: denoting a flight length of the aircraft $Flt_i$ at the flight segment $[Pt_{i,j}, Pt_{i,k}]$;

$SegMinSpeed_{j,k}$: denoting a minimum safe flight speed of the aircraft $Flt_i$ at the flight segment $[Pt_{i,j}, Pt_{i,k}]$, wherein the parameter is acquired according to the aircraft performance or an airspace operation limit;

$SegMaxSpeed_{j,k}$: denoting a maximum safe flight speed of the aircraft $Flt_i$ at the flight segment $[Pt_{i,j}, Pt_{i,k}]$, wherein the parameter is acquired according to the aircraft performance or the airspace operation limit;

Seg Pr $o_{j,k}$: denoting a flight status of the aircraft $Flt_i$ at the flight segment $[Pt_{i,k}]$, wherein a value of 1 denotes level flight, and a value of 0 denotes others;

$SegDelay_{j,k}$: denoting a delay value that needs to be consumed by the aircraft $Flt_i$ at the flight segment $[Pt_{i,j}, Pt_{i,k}]$;

$SegDelayTmp_{j,k}$: denoting a temporary variable of the delay that needs to be consumed by the aircraft $Flt_i$ at the flight segment $[Pt_{i,j}, Pt_{i,k}]$;

$SegMaxDelay_{j,k}$: denoting a maximum positive delay value capable of being consumed by the aircraft $Flt_i$ at the flight segment $[Pt_{i,j}, Pt_{i,k}]$; and $SegMaxAcc_{j,k}$: denoting a maximum negative delay value capable of being consumed by the aircraft $Flt_i$ at the flight segment $[Pt_{i,j}, Pt_{i,k}]$.

3. The time-space conversion method of flight sequencing information according to claim 1, wherein the dividing the flight segment according to the sequencing key point in the step 2-3 comprises: according to sequencing key point information in the flight trajectory point queue $PtList_i$ of the aircraft $Flt_i$, dividing the delay-consumed flight segment $[Pt_{i,bgn}, Pt_{i,PtNum_i}]$ selected in the step 2-2 into a plurality of the flight segments with overlapped boundary points, wherein the method is as follows:

step 2-3-1: setting a starting point of a sub-segment to be divided in the flight trajectory point queue $PtList_i$ of the flight, which is denoted with $Pt_{i,m}$, and letting $Pt_{i,m}=Pt_{i,bgn}$, wherein m denotes a serial number of the point $Pt_{i,m}$ in the queue $PtList_i$;

step 2-3-2: searching for the closest sequencing key point after $Pt_{i,m}$ from $PtList_i$, which is used as an end point of the sub-segment to be divided, and denoted with $Pt_{i,n}$, wherein n denotes a serial number of the point $Pt_{i,n}$ in the queue $PtList_i$, then the divided sub-flight segment is denoted with $[Pt_{i,m}, Pt_{i,n}]$; and step 2-3-3: letting $Pt_{i,m}=Pt_{i,n}$, and repeating the step 2-3-2 till the last point in $PtList_i$;

all the sub-flight segments divided in the step satisfy the following conditions:

condition 1: $[Pt_{i,m}, Pt_{i,n}] \neq \emptyset$
condition 2: $[Pt_{i,m}, Pt_{i,n}] \subset [Pt_{i,bgn}, Pt_{i,PtNum_i}]$ and
condition 3: $\cup [Pt_{i,m}, Pt_{i,n}] = [Pt_{i,bgn}, Pt_{i,PtNum_i}]$.

4. The time-space conversion method of flight sequencing information according to claim 3, wherein the method of dividing the flight segment according to the flight status in the step 2-4 comprises: subdividing each flight segment $[Pt_{i,m}, Pt_{i,n}]$ divided in the step 2-3 according to the flight status of the aircraft in the flight segment, wherein the method comprises:

dividing the flight segment $[Pt_{i,m}, Pt_{i,n}]$ into the plurality of the flight segments $[Pt_{i,o}, Pt_{i,p}]$ with overlapped boundary points according to the flight status of the aircraft, wherein o denotes a serial number of the point $Pt_{i,o}$ in the queue $PtList_i$, p denotes a serial number of the point $Pt_{i,p}$ in the queue $PtList_i$, and movement status of the flight $Flt_i$ in each small flight segment are consistent; and synchronously recording a flight status tag Seg Pr $o_{o,p}$ of the flight $Flt_i$ in each small flight segment $[Pt_{i,o}, Pt_{i,p}]$; and recording a number of the flight segments divided from the flight segment $[Pt_{i,m}, Pt_{i,n}]$ in the step as $SegNum_{m,n}$, wherein all the flight segments satisfy the following conditions:

condition 1: $[Pt_{i,o}, Pt_{i,p}] \neq \emptyset$
condition 2: $[Pt_{i,o}, Pt_{i,p}] \subseteq [Pt_{i,m}, Pt_{i,n}]$ and
condition 3: $\cup_1^{SegNum_{m,n}} [Pt_{i,o}, Pt_{i,p}] = [Pt_{i,m}, Pt_{i,n}]$.

5. The time-space conversion method of flight sequencing information according to claim 4, wherein the method of allocating the flight segment delay in the step 2-5 comprises: allocating the sequencing delay of the aircraft at the sequencing key point to each flight segment according to the flight status and the flight segment length of the aircraft on each flight segment and the aircraft performance;

performing the following steps in turn for each sub-flight segment $[Pt_{i,m}, Pt_{i,n}]$ of the flight $Flt_i$ divided in the step 2-3:

step 2-5-1: calculating a total delay of the flight segment: calculating the total delay that needs to be consumed by the flight $Flt_i$ at the flight segment $[Pt_{i,m}, Pt_{i,n}]$ as:

$$SegDelay_{m,n} = (CTO_{i,n} - ETO_{i,n}) - (CTO_{i,m} - ETO_{i,m}) \quad (5)$$

step 2-5-2: calculating an upper limit of the flight segment delay:

estimating the upper limit of the delay of the aircraft at the flight segment from a perspective of performance according to a level flight distance, a minimum level flight speed and a maximum level flight speed of the aircraft in the flight segment;

referring to the step 2-4, and letting each small flight segment divided in the flight segment $[Pt_{i,m}, Pt_{i,n}]$ be $[Pt_{i,o}, Pt_{i,p}]$, then a maximum positive delay capable of being allocated by the flight $Flt_i$ at each small flight segment is:

$$SegMaxDelay_{o,p} = \left( \frac{SegDis_{o,p}}{SegMinSpeed_{o,p}} - (ETO_{i,p} - ETO_{i,0}) \right) * SegPro_{o,p} \quad (6)$$

a maximum advance value capable of being allocated by the flight $Flt_i$ at the small flight segment $[Pt_{i,o}, Pt_{i,p}]$ is:

$$SegMaxAcc_{o,p} = \left( (ETO_{i,p} - ETO_{i,0}) - \frac{SegDis_{o,p}}{SegMaxSpeed_{o,p}} \right) * SegPro_{o,p} \quad (7)$$

then, the upper limit of the delay capable of being allocated by the flight $Flt_1$ at the small flight segment $[Pt_{i,m}, Pt_{i,n}]$ is:

$$SegMaxDelay_{m,n} = \Sigma_1^{SegNum_{m,n}} SegMaxDelay_{o,p} \quad (8)$$

$$SegMaxAcc_{m,n} = \Sigma_1^{SegNum_{m,n}} SegMaxAcc_{o,p} \quad (9)$$

step 2-5-3: judging whether the flight segment is delayed:
when any of the following conditions are satisfied, it is indicated that the delay of the flight $Flt_i$ at the flight segment $[Pt_{i,m}, Pt_{i,n}]$ is excessive, prompting that the flight needs to be manually guided for delay absorption, and returning to step 2-5-1 to continuously processing next sub-flight segment; otherwise, indicating that the delay is within an acceptable range, and continuing subsequent steps;
excessive flight segment delay conditions are as follows:
condition 1: $SegDelay_{m,n} > 0 \&\& SegDelay_{m,n} > SegMaxDelay_{m,n}$ and
condition 2: $SegDelay_{m,n} < 0 \&\& |SegDelay_{m,n}| > SegMaxAcc_{m,n}$
step 2-5-4: allocating the flight segment delay:
allocating a delay for each level flight segment according to a distance and a delay absorption capacity of each level flight segment, wherein the method comprises:
letting $SegDelayTmp_{m,n}$ be the delay needing to be received by the flight $Flt_i$ at the flight segment $[Pt_{i,m}, Pt_{i,n}]$ in the step, and $SegDelayTmp_{m,n} = SegDelay_{m,n}$; and
initializing the delay of each small flight segment $[Pt_{i,o}, Pt_{i,p}]$ in the flight segment $[Pt_{i,m}, Pt_{i,n}]$ and letting $SegDelay_{o,p} = 0$; and
step 2-5-5: allocating a waypoint delay:
calculating a sequencing time and a delay of the flight $Flt_i$ in a non-sequencing key point of the flight segment $[Pt_{i,m}, Pt_{i,n}]$ according to the delay $SegDelay_{o,p}$ allocated for the flight $Flt_i$ at each small flight segment $[Pt_{i,o}, Pt_{i,p}]$ in the flight segment $[Pt_{i,m}, Pt_{i,n}]$ in the step 2-5-4, wherein the sequencing time and the delay of the sequencing key point are generated by the step 1;
starting from an origin of the flight segment $[Pt_{i,m}, Pt_{i,n}]$, for any point $Pt_{i,q}$ in the flight segment, q denoting a serial number of the point $Pt_{i,q}$ in the queue $PtList_i$, positioning a small flight segment that the point belongs to, i.e. $Pt_{i,q} \in [Pt_{i,o}, Pt_{i,p}]$, then the delay needing to be allocated to the point is as follows:

$$PrDelay_{i,q} = \begin{cases} \frac{SegDis_{q-1,q}}{SegDis_{o,p}} * SegDelay_{o,p} + & Pt_{q-1} \in [Pt_{i,o}, Pt_{i,p}] \&\& \\ PtDelay_{i,q-1}, & PtPro_{i,q} = 0 \\ CTO_{i,q} - ETO_{i,q}, & \text{else} \end{cases} \quad (13)$$

the sequencing time of the point $Pt_{i,q}$ is:

$$CTO_{i,q} = ETO_{i,q} + PtDelay_{i,q} \quad (14).$$

6. The time-space conversion method of flight sequencing information according to claim 5, wherein the step 2-5-4 comprises the following steps of:
step 2-5-4-1: allocating the flight segment delay:
for each small flight segment $[Pt_{i,o}, Pt_{i,p}]$ in the flight segment $[Pt_{i,m}, Pt_{i,n}]$, the calculating method for allocating the delay according to the level flight distance of each small flight segment is as follows:

$$SegDelay_{o,p} = \quad (10)$$

$$SegDelay_{o,p} + SegDelayTmp_{m,n} * \frac{SegDis_{o,p} * SegPro_{o,p}}{\sum_1^{SegNum_{m,n}} SegDis_{o,p} * SegPro_{o,p}}$$

correcting according to a flight segment delay absorption capacity, wherein the method is as follows:

$$SegDelay_{o,p} = \quad (11)$$

$$\begin{cases} SegMaxDelay_{o,p}, & SegDelay_{o,p} > SegMaxDelay_{o,p} \\ -1 * SegMaxAcc_{o,p}, & SegDelay_{o,p} < (-1 * SegMaxAcc_{o,p}) \\ SegDelay_{o,p}, & \text{else} \end{cases}$$

step 2-5-4-2: detecting a delay allocation result:
detecting whether any delay which is not allocated exists in the flight segment $[Pt_{i,m}, Pt_{i,n}]$, wherein the method is as follows:

$$SegDelayTmp_{m,n} = SegDelay_{m,n} - \Sigma_1^{SegNum_{m,n}} SegDelay_{o,p} \quad (12)$$

when satisfying that $SegDelayTmp_{m,n} = 0$, indicating that the delay of the flight segment $[Pt_{i,m}, Pt_{i,n}]$ is completely allocated, and continuing step 2-5-5; otherwise, returning to step 2-5-4-1, and updating the flight segment delay allocation result.

7. The time-space conversion method of flight sequencing information according to claim 6, wherein the step 3 comprises the following steps of:
step 3-1: defining variables;
step 3-2: positioning the reference flight segment;
step 3-3: generating a reference position point; and
step 3-4: generating the reference trajectory circle;
wherein the defining the variables in the step 3-1 comprises:
$Lat(Pt_{i,j})$: denoting a latitude of the flight $Flt_i$ at the waypoint $Pt_{i,j}$;
$Lon(Pt_{i,j})$: denoting a longitude of the flight $Flt_i$ at the waypoint $Pt_{i,j}$;
$Velo(Pt_{i,j})$: denoting a speed suggestion of the flight $Flt_i$ passing through the waypoint $Pt_{i,j}$;
Res Div: denoting a deviation limit between an actual passing time at the sequencing key point and the sequencing passing time of the flight;
$ATO_{i,j}$: denoting an actual passing time of the flight $Flt_i$ at the waypoint $Pt_{i,j}$; and
R: denoting a radius of the reference trajectory circle;
step 3-2: positioning the reference flight segment:
re-positioning the reference flight segment $[Pt_{i,ref}, Pt_{i,ref+1}]$ at which the flight is $Flt_i$ currently located according to the sequencing passing time $CTO_{i,j}$ of each point $Pt_{i,j}$ in the flight trajectory point queue $PtList_i$ of the flight $Flt_i$ calculated in the step 2-5-5, and satisfying that $SysTime \in [CTO_{i,ref}, CTO_{i,ref+1}]$; and
step 3-3: generating the reference position point:
approximately solving a real-time reference position point of the aircraft at the current time of the system by using a difference method, wherein the method comprises:
letting $Pt_{i,x}$ be the current reference position point of the flight $Flt_i$, wherein x denotes a serial number of a point $Pt_{i,x}$ in the queue $PtList_i$, and letting the current reference flight segment at which the flight $Flt_i$ is located be $[Pt_{i,ref}, Pt_{i,ref+1}]$ with reference to the step 3-2, then the method for calculating related information of the reference position point is as follows:

$$Lat(Pt_{i,x}) = \qquad (15)$$
$$Lat(Pt_{i,ref}) + \frac{SysTime - CTO_{i,ref}}{CTO_{i,ref+1} - CTO_{i,ref}} * (Lat(Pt_{i,ref+1}) - Lat(Pt_{i,ref}))$$

$$Lon(Pt_{i,x}) = \qquad (16)$$
$$Lon(Pt_{i,ref}) + \frac{SysTime - CTO_{i,ref}}{CTO_{i,ref+1} - CTO_{i,ref}} * (Lon(Pt_{i,ref+1}) - Lon(Pt_{i,ref}))$$

$$Velo(Pt_{i,x}) = \frac{SegDis_{ref,ref+1}}{CTO_{i,ref+1} - CTO_{i,ref}}. \qquad (17)$$

8. The time-space conversion method of flight sequencing information according to claim 7, wherein the step 3-4 comprises the following step of:

when the actual passing time $ATO_{i,j}$ of the flight at the sequencing key point satisfies that:

$ATO_{i,j} \in [CTO_{i,j}-\text{Res Div}, CTO_{i,j}+\text{Res Div}]$ indicating that the flight runs according to the sequencing time;

introducing the reference trajectory circle on the basis of the reference position point in the step 3-3, which is a circle taking the reference position point as a center point and R as a radius;

wherein the calculation formula of the radius of the reference trajectory circle is:

$R = Velo(Pt_{i,x}) * \text{Res Div} \qquad (18).$

* * * * *